(12) United States Patent
Alonzo et al.

(10) Patent No.: US 12,473,446 B2
(45) Date of Patent: Nov. 18, 2025

(54) PHOTOCURABLE INKS AND PRIMERS FOR AUTOMOTIVE INTERIOR APPLICATIONS AND GLASS ARTICLES COMPRISING SAME

(71) Applicant: CORNING INCORPORATED, Corning, NY (US)

(72) Inventors: Carlos Francis Alonzo, Corning, NY (US); Donald Martin Bott, Rochester, NY (US); Aaron Bradley Gleason, Bath, NY (US); Mandakini Kanungo, Ithaca, NY (US); Steven Isaac Massey, Horseheads, NY (US); Dean Joseph Mastropietro, Corning, NY (US); Manoj Meda, Painted Post, NY (US); Timothy Edward Myers, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 19/052,507

(22) Filed: Feb. 13, 2025

(65) Prior Publication Data

US 2025/0178956 A1 Jun. 5, 2025

Related U.S. Application Data

(63) Continuation of application No. 18/766,940, filed on Jul. 9, 2024.

(Continued)

(51) Int. Cl.
*B41M 5/00* (2006.01)
*B41M 7/00* (2006.01)
(Continued)

(52) U.S. Cl.
CPC .......... *C09D 11/322* (2013.01); *B41M 5/0017* (2013.01); *B41M 5/0047* (2013.01);
(Continued)

(58) Field of Classification Search
CPC ....... C03C 25/285; C03C 25/24; C03C 17/28; C03C 17/34; G02F 2201/08
(Continued)

(56) References Cited

U.S. PATENT DOCUMENTS 7,423,105 B2  9/2008  Winningham
10,259,957 B2  4/2019  Park et al.
(Continued)

FOREIGN PATENT DOCUMENTS

EP  3279279 A1  2/2018
EP  3101072 B1  8/2019
(Continued)

OTHER PUBLICATIONS

"Limits of Volatile Organic Compounds (VOCs) in Printing Ink", GB 38507-2020, 11 pages.
(Continued)

*Primary Examiner* — Ruiyun Zhang
(74) *Attorney, Agent, or Firm* — William M. Johnson

(57) ABSTRACT

An ultraviolet ink composition includes from 25 wt % to 50 wt % of a pigment dispersion, from greater than 0 wt % to 10 wt % of a photoinitiator package; from 10 wt % to 42 wt % of a reactive diluent; from 10 wt % to 20 wt % of a multifunctional monomer; and from 0 wt % to 25 wt % of a difunctional monomer. An ink primer includes from 2 wt % to 10 wt % of an adhesion promoter configured to bond to glass and from 90 wt % to 98 wt % of a solvent configured to promote bonding of the adhesion promoter to the glass. Another ink primer includes from 2 wt % to 10 wt % of an adhesion promoter configured to bond to glass, from greater
(Continued)

than 0 wt % to 10 wt % of a photoinitiator package; and from 30 wt % to 45 wt % of a monofunctional monomer.

20 Claims, 11 Drawing Sheets

Related U.S. Application Data

(60) Provisional application No. 63/601,925, filed on Nov. 22, 2023, provisional application No. 63/526,560, filed on Jul. 13, 2023.

(51) Int. Cl.
  *C03C 17/28* (2006.01)
  *C03C 17/34* (2006.01)
  *C03C 25/24* (2018.01)
  *C03C 25/285* (2018.01)
  *C09D 11/322* (2014.01)
  *C09D 11/38* (2014.01)

(52) U.S. Cl.
  CPC .......... *B41M 5/007* (2013.01); *B41M 7/0081* (2013.01); *B41M 7/009* (2013.01); *C03C 17/28* (2013.01); *C03C 17/34* (2013.01); *C03C 25/24* (2013.01); *C03C 25/285* (2013.01); *C09D 11/38* (2013.01); *G02F 2201/08* (2013.01)

(58) Field of Classification Search
  USPC .................................. 428/1.6, 1.62
  See application file for complete search history.

(56) References Cited

U.S. PATENT DOCUMENTS

| | | |
|---|---|---|
| 10,414,926 B2 | 9/2019 | Park et al. |
| 10,723,900 B2 | 7/2020 | Yoo et al. |
| 10,739,677 B2 | 8/2020 | Park et al. |
| 11,772,361 B2 | 10/2023 | Hawtof et al. |
| 2017/0146732 A1 | 5/2017 | Botelho et al. |
| 2018/0079921 A1 | 3/2018 | Okamoto et al. |
| 2019/0012033 A1 | 1/2019 | Brandao Salgado et al. |
| 2019/0315648 A1 | 10/2019 | Kumar et al. |
| 2019/0329531 A1 | 10/2019 | Brennan et al. |
| 2020/0031141 A1 | 1/2020 | Yoo et al. |
| 2021/0308986 A1 | 10/2021 | Hawtof et al. |
| 2022/0119656 A1 | 4/2022 | Loccufier et al. |
| 2022/0372319 A1 | 11/2022 | Kikutsuji et al. |

FOREIGN PATENT DOCUMENTS

| | | |
|---|---|---|
| EP | 3686251 A1 | 7/2020 |
| KR | 10-2017-0115797 A | 10/2017 |
| KR | 10-2021-0014913 A | 2/2021 |
| KR | 10-2021-0014914 A | 2/2021 |
| WO | 2008/045478 A1 | 4/2008 |
| WO | 2019/055458 A1 | 3/2019 |
| WO | 2020/205519 A1 | 10/2020 |
| WO | 2021/118835 A1 | 6/2021 |
| WO | 2023/146762 A1 | 8/2023 |

OTHER PUBLICATIONS

Extended European search report, EP application No. 24184770.6, dated Mar. 12, 2025, 11 pages, European Patent Office.

PHOTOCURABLE INKS AND PRIMERS FOR AUTOMOTIVE INTERIOR APPLICATIONS AND GLASS ARTICLES COMPRISING SAME

CROSS-REFERENCE TO RELATED APPLICATIONS

This application is a continuation of and claims benefit of priority to U.S. patent application Ser. No. 18/766,940, filed on Jul. 9, 2024, which claims the benefit of priority of U.S. Provisional Application Ser. No. 63/601,925, filed on Nov. 22, 2023 and U.S. Provisional Application Ser. No. 63/526,560, filed on Jul. 13, 2023, the contents of each of which are relied upon and incorporated herein by reference in their entireties.

FIELD

The present specification generally relates to automotive interior glass articles and, in particular, photocurable inks and primers used to form opaque layers on display cover glass having relatively high adhesion to the glass and high optical density.

TECHNICAL BACKGROUND

Automotive interiors may include displays that include a display cover glass. A display module (e.g., a liquid crystal display ("LCD") module, an organic light emitting diode ("OLED") display module, or other suitable type of display module) may be laminated to or otherwise integrated with the cover glass such that the cover glass protects the display module and/or provides one or more performance enhancing attributes (e.g., anti-glare or anti-reflective properties) to the display module. A decorative ink may be applied to areas of the cover glass to conceal various components (e.g., electrical and mechanical connections) of the display and/or provide the display with a uniform appearance when the display is powered down. Certain existing inks used for decorating display cover glass may suffer from various deficiencies, such as low throughput, undesirable optical density, and inadequate adhesion, rendering these inks unsuitable for automotive interior applications.

Accordingly, an alternative ink that meets requirements associated with automotive interior display applications is needed.

SUMMARY

According to a first aspect A1, an ultraviolet curable ink composition comprises, based on a total weight of the ultraviolet curable ink composition: greater than or equal to 25 wt % and less than or equal to 50 wt % of a pigment dispersion, wherein the pigment dispersion comprises, based on a total weight of the pigment dispersion, at least 30 wt % of a pigment and a reactive monomer; greater than 0 wt % and less than or equal to 10 wt % of a photoinitiator package, the photoinitiator package comprising a type I photoinitiator, a type II photoinitiator, and an amine synergist; greater than or equal to 10 wt % and less than or equal to 42 wt % of a reactive diluent, the reactive diluent comprising a viscosity less than 5 cPs at 25° C.; greater than or equal to 5 wt % and less than or equal to 20 wt % of a multifunctional monomer; and greater than or equal to 0 wt % and less than or equal to 35 wt % of a difunctional monomer.

A second aspect A2 includes the ultraviolet curable ink composition of the first aspect A1, wherein the ultraviolet curable ink composition comprises greater than or equal to 10 wt % and less than or equal to 35% of the difunctional monomer.

A third aspect A3 includes the ultraviolet curable ink composition of the second aspect A2, wherein a combined amount of the reactive diluent, the multifunctional monomer, and the difunctional monomer is less than or equal to 60 wt %.

A fourth aspect A4 includes the ultraviolet curable ink composition of any of the first through third aspects A1-A3, wherein the ultraviolet curable ink composition further comprises greater than 0 wt % and less than or equal to 10 wt % of an adhesion promoter.

A fifth aspect A5 includes the ultraviolet curable ink composition of any of the first through fourth aspects A1-A4, wherein the ultraviolet curable ink composition is free of resin and free of TPO.

A sixth aspect A6 includes the ultraviolet curable ink composition of any of the first through fifth aspects A1-A5, wherein the ultraviolet curable ink composition exhibits a viscosity greater than or equal to 8 cPs and less than or equal to 13 cPs over a temperature range from 30° C. to 50° C.

A seventh aspect A7 includes the ultraviolet curable ink composition of any of the first through sixth aspects A1-A6, wherein the pigment dispersion comprises, based on the total weight of the pigment dispersion, greater than or equal to 35 wt % of the pigment, and wherein the pigment is a carbon black pigment.

An eighth aspect A8 includes the ultraviolet curable ink composition of any of the first through seventh aspects A1-A7, wherein after being deposited on a glass substrate and cured using a UV light source to form an opaque layer with a post-cure thickness less than 15 μm, the opaque layer exhibits an optical density greater than 5.

According to a ninth aspect A9, a glass substrate having a first major surface and a second major surface, the second major surface being opposite the first major surface; and an opaque layer disposed on the second major surface, the opaque layer comprising a photocurable ink comprising at least 11 wt % of a pigment, wherein: the opaque layer is resin free and TPO free, the opaque layer comprises a thickness less than or equal to 15 μm and an optical density greater than or equal to 5.0, and after curing solely via exposure to ultraviolet ("UV") radiation, the opaque layer exhibits: a pencil hardness greater than or equal to 3H, when measured according to ASTM 3363, and an adhesion to the glass substrate greater than or equal to 4B, after being subjected to a temperature of 85° C. at 95% relative humidity for a period of at least 500 hours, when tested according to ASTM 3359.

A tenth aspect A10 includes the glass article of the ninth aspect A9, wherein the pigment comprises an average particle size less than or equal to 200 nm.

An eleventh aspect A11 includes the glass article of any of the ninth through tenth aspects A9-A10, wherein the opaque layer exhibits a cured surface tension greater than 36 dynes/cm.

A twelfth aspect A12 includes the glass article of any of the ninth through eleventh aspects A9-A11, wherein the opaque layer exhibits an electrical resistivity greater than or equal to $1 \times 10^9$ Ω/sq, when measured according to ASTM D-257 at 100V DC.

A thirteenth aspect A13 includes the glass article of any of the ninth through twelfth aspects A9-A12, wherein the glass article exhibits a CIELAB SCI L* value less than or equal to 30, when illuminated at a 10° angle by a D65 illuminant.

A fourteenth aspect A14 includes the glass article of any of the ninth through thirteenth aspects A9-A13, wherein the glass article exhibits a CIELAB SCI a* value greater than or equal to −0.05 and less than or equal to 0.15 and a CIELAB SCI b* value greater than or equal to −0.3 and less than or equal to −0.1, when illuminated at a 10° angle by a D65 illuminant.

A fifteenth aspect A15 includes the glass article of any of the ninth through fourteenth aspects A9-A14, wherein after 500 1 hour cycles of being held at a temperature of −40° C. for 0.5 hours and a temperature of 95° C. for 0.5 hours, the opaque layer exhibits an adhesion to the glass substrate greater than or equal to 4B, when tested according to ASTM 3359.

A sixteenth aspect A16 includes the glass article of the fifteenth aspect A15, wherein the glass article exhibits a maximum ΔE value (both SCI and SCE), measured both prior to and after the 500 1 hour cycles, less than 2.0.

A seventeenth aspect A17 includes the glass articles of any of the ninth through sixteenth aspects A9-A16, the glass substrate comprises at least one of soda lime glass, aluminosilicate glass, borosilicate glass, boroaluminosilicate glass, alkali-containing aluminosilicate glass, and alkali-containing borosilicate glass.

According to an eighteenth aspect A18, a method of fabricating a glass article comprises: depositing a plurality of sub-layers of an ultraviolet curable ink composition onto a first major surface of a glass substrate at a deposition temperature less than or equal to 65° C. using an inkjet printhead, wherein during the depositing, the ultraviolet curable ink composition has a viscosity less than 13 cPs, wherein the ultraviolet curable ink composition comprises: greater than or equal to 25 wt % and less than or equal to 50 wt % of a pigment dispersion, wherein the pigment dispersion comprises at least 30 wt % of a pigment and a reactive monomer; greater than 0 wt % and less than or equal to 10 wt % of a photoinitiator package; greater than or equal to 10 wt % and less than or equal to 42 wt % of a reactive diluent, the reactive diluent comprising a viscosity less than 5 cPs at 25° C.; greater than or equal to 10 wt % and less than or equal to 20 wt % of a multifunctional monomer; and greater than or equal to 0 wt % and less than or equal to 35 wt % of a difunctional monomer; and between deposition of adjacent ones of the plurality of sub-layers, pinning each of the plurality sub-layers by exposing the plurality of sub-layers to UV light from a UV light source to at least partially cure the ultraviolet curable ink composition making up that sub-layer.

A nineteenth aspect A19 includes the method of the eighteenth aspect A18, wherein each of the plurality of sub-layers comprises a thickness greater than or equal to 2 μm and less than or equal to 4 μm after the pinning.

A twentieth aspect A20 includes the method of the nineteenth aspect A19, wherein the depositing and pinning occurs in three or more deposition and pinning stages, wherein each deposition and pinning stage comprises an inkjet printhead that deposits one of the plurality of sub-layers and a UV light source for pinning that sub-layer.

A twenty-first aspect A21 includes the method of the twentieth aspect A20, wherein, during the depositing and pinning, the glass substrate is moved relative to the deposition and pinning stages at a translation velocity greater than or equal to 1 m/min and less than or equal to 5 m/min.

A twenty-second aspect A22 includes the method of the twenty-first aspect A21, wherein the glass substrate is moved on a plurality of rollers contacting a second major surface of the glass substrate opposite the first major surface.

A twenty-third aspect A23 includes the method of any of the twenty-first through twenty-second aspects A21-A22, wherein the UV light source of each of the deposition and pinning stages are configured to apply a pin dosage of UV light to the sub-layer greater than or equal to 0.2 J/cm$^2$ and less than or equal to 10 J/cm$^2$.

A twenty-fourth aspect A24 includes the method of the twenty-third aspect A23, wherein after the depositing and pinning via the deposition and pinning stages, the plurality of sub-layers form an opaque layer that has a thickness less than 15 μm and exhibits: an optical density greater than 5, and an adhesion to the glass substrate greater than or equal to 4B, when tested according to ASTM 3359, without application of any additional UV light thereto outside of the deposition and pinning stages.

A twenty-fifth aspect A25 includes the method of any of the twenty-first through twenty third aspects A21-A23, further comprising, after the deposition and pinning stages, exposing the sub-layers to additional UV light in a final curing stage, the final curing stage comprising a first UV light source configured to expose the sub-layer directly to a curing dose of UV light greater than or equal to 10 J/cm$^2$ and less than or equal to 100 J/cm$^2$.

A twenty-sixth aspect A26 includes the method of the twenty-fifth aspect A25, wherein after exposure to the curing dose, the plurality of sub-layers form an opaque layer having a thickness less than 15 μm and exhibits: an optical density greater than 5, and an adhesion to the glass substrate greater than or equal to 4B, when tested according to ASTM 3359.

A twenty-seventh aspect A27 includes the method of the twenty-sixth aspect A26, wherein the adhesion is exhibited without any exposure to UV light from a side of a second major surface of the glass substrate opposite the first major surface.

A twenty-eighth aspect A28 includes the method of the twenty-sixth aspect A26, wherein the final curing stage comprises a second UV light source configured to expose the sub-layers to UV light through the glass substrate from a side of a second major surface of the glass substrate opposite the first major surface.

According to a twenty-ninth aspect A29, an ink primer comprises, based on a total weight of the ink primer: greater than or equal to 2 wt % and less than or equal to 10 wt % of an adhesion promoter configured to bond to glass; and greater than or equal to 90 wt % and less than or equal to 98 wt % of a solvent configured to promote bonding of the adhesion promoter to the glass.

A thirtieth aspect A30 includes the ink primer of the twenty-ninth aspect A29, wherein the adhesion promoter comprises an organofunctional silane.

A thirty-first aspect A31 includes the ink primer of the twenty-ninth aspect A29 or the thirtieth aspect A30, wherein the ink primer is an infrared curable ink primer.

A thirty-second aspect A32 includes the ink primer of any of the twenty-ninth through thirty-first aspects A29-A31, wherein the solvent comprises 3-methoxy-3-methyl-1-butanol; butanol; ethylene glycol ether; 2-butoxy ethanol; propylene glycol monomethyl ether acetate; propylene glycol; 2-butoxy ethyl acetate; ethylene glycol; 1,4-butane diol; diethyl succinate; or combinations thereof.

A thirty-third aspect A33 includes the ink primer of any of the twenty-ninth through thirty-second aspects A29-A32, wherein the ink primer is free of resin and free of TPO.

A thirty-fourth aspect A34 includes the ink primer of any of the twenty-ninth through thirty-third aspects A29-A33, wherein the ink primer exhibits a viscosity greater than or equal to 8 cPs and less than or equal to 13 cPs over a temperature range from 30° C. to 50° C.

According to a thirty-fifth aspect A35, an ink primer comprises, based on a total weight of the ink primer: greater than or equal to 2 wt % and less than or equal to 10 wt % of an adhesion promoter configured to bond to glass; greater than 0 wt % and less than or equal to 10 wt % of a photoinitiator package, the photoinitiator package comprising a type I photoinitiator, a type II photoinitiator, and an amine synergist; and greater than or equal to 30 wt % and less than or equal to 45 wt % of a monofunctional monomer.

A thirty-sixth aspect A36 includes the ink primer of the thirty-fifth aspect A35, wherein the adhesion promoter comprises an organofunctional silane.

A thirty-seventh aspect A37 includes the ink primer of the thirty-fifth aspect A35 or the thirty-sixth aspect A36, wherein the ink primer is an ultraviolet curable ink primer.

A thirty-eighth aspect A38 includes the ink primer of any of the thirty-fifth through thirty-seventh aspects A35-A37, wherein the ink primer comprises greater than or equal to 4 wt % and less than or equal to 10 wt % of the adhesion promoter.

A thirty-ninth aspect A39 includes the ink primer of any of the thirty-fifth through thirty-eighth aspects A35-A38, wherein the type I photoinitiator comprises phenylbis(2,4,6-trimethylbenzoyl)phosphine oxide; 1-hydroxycyclohexyl-phenyl ketone; (2,6-dimethoxybenzoyl)-2,4,4-trimethylpentyl phosphine oxide; 2,2-dimethoxyl-2-phenyl acetophenone; (2,4,6-trimethylbenzoyl)diphenyl phosphine oxide; ethoxy(2,4,6-trimethylbenzoyl)phenyl phosphine oxide; or combinations thereof.

A fortieth aspect A40 includes the ink primer of any of the thirty-fifth through thirty-ninth aspects A35-A39, wherein the type II photoinitiator comprises isopropylthioxanthone, benzophenone, 4-phenylbenzophenone, methyl-2-benzoylbenzoate, ketosulphone, or combinations thereof.

A forty-first aspect A41 includes the ink primer of any of the thirty-fifth through fortieth aspects A35-A40, wherein the amine synergist comprises ethyl 4-(dimethylamino) benzoate; N, N-[2-(4-dimethylaminobenzoyl)oxyethylen-1-yl] methylamine; N-methyl diethanolamine; ethyl-4-dimethyl aminobenzoate; 2-ethylhexyl-4-dimethylaminobenzoate; or combinations thereof.

A forty-second aspect A42 includes the ink primer of any of the thirty-fifth through forty-first aspects A35-A41, wherein the monofunctional monomer comprises isobornyl acrylate.

A forty-third aspect A43 includes the ink primer of any of the thirty-fifth through forty-second aspects A35-A42, wherein the ink primer further comprises greater than 0 wt % and less than or equal to 30 wt % of a reactive diluent, the reactive diluent comprising a viscosity less than 5 cPs at 25° C.

A forty-fourth aspect A44 includes the ink primer of the forty-third aspect A43, wherein the reactive diluent comprises vinyl methyl oxazolidinone; 5-methyl-3-vinyloxazolidin-2-one; N-vinyl monomers; or combinations thereof.

A forty-fifth aspect A45 includes the ink primer of any of the thirty-fifth through forty-fourth aspect A35-A44, wherein the ink primer further comprises greater than 0 wt % and less than or equal to 35 wt % of a difunctional monomer.

A forty-sixth aspect A46 includes the ink primer of the forty-fifth aspect A45, wherein the difunctional monomer comprises 3-methyl-1,5-pentanediyl diacrylate; dipropylene glycol diacrylate; or combinations thereof.

A forty-seventh aspect A47 includes the ink primer of any of the thirty-fifth through forty-sixth aspect A35-A46, wherein the ink primer further comprises greater than or equal to 5 wt % and less than or equal to 10 wt % of a solvent.

A forty-eighth aspect A48 includes the ink primer of the forty-seventh aspect A47, wherein the solvent comprises 3-methoxy-3-methyl-1-butanol; butanol; ethylene glycol ether; 2-butoxy ethanol; propylene glycol monomethyl ether acetate; propylene glycol; 2-butoxy ethyl acetate; ethylene glycol; 1,4-butane diol; diethyl succinate; or combinations thereof.

A forty-ninth aspect A49 includes the ink primer of any of the thirty-fifth through forty-eighth aspects A35-A48, wherein the ink primer is free of resin and free of TPO.

A fiftieth aspect A50 includes the ink primer of any of the thirty-fifth through forty-ninth aspects A35-A49, wherein the ink primer exhibits a viscosity greater than or equal to 8 cPs and less than or equal to 13 cPs over a temperature range from 30° C. to 50° C.

According to a fifty-first aspect A51, a glass article comprises: a glass substrate having a first major surface and a second major surface, the second major surface being opposite the first major surface; and an opaque layer disposed on the second major surface, the opaque layer comprising an ink composition comprising at least 11 wt % of a pigment and an adhesion promoter, the adhesion promoter being bonded to the glass substrate and the ink composition being polymerized with the adhesion promoter, wherein: the opaque layer comprises a thickness less than or equal to 15 μm and an optical density greater than or equal to 5.0, and the opaque layer exhibits an adhesion to the glass substrate greater than or equal to 4B, after 500 1 hour cycles of being held at a temperature of −40° C. for 0.5 hours and a temperature of 95° C. for 0.5 hours, when tested according to ASTM 3359.

A fifty-second aspect A52 includes the glass article of the fifty-first aspect A51, wherein the adhesion promoter comprises an organofunctional silane.

A fifty-third aspect A53 includes the glass article of the fifty-first aspect A51 or the fifty-second aspect A52, wherein the opaque layer is resin free and TPO free.

A fifty-fourth aspect A54 includes the glass article of any of the fifty-first through fifty-third aspects A51-A53, wherein the glass article exhibits a maximum ΔE value (both SCI and SCE), measured both prior to and after the 500 1 hour cycles, less than 2.0.

A fifty-fifth aspect A55 includes the glass article of any of the fifty-first through fifty-fourth aspects A51-A54, wherein the glass substrate comprises at least one of soda lime glass, aluminosilicate glass, borosilicate glass, boroaluminosilicate glass, alkali-containing aluminosilicate glass, and alkali-containing borosilicate glass.

According to a fifty-sixth aspect A56, a method of fabricating a glass article comprises: depositing an ink primer onto a first major surface of a glass substrate at a first deposition temperature less than or equal to 65° C. using a first inkjet printhead, wherein during the depositing, the ink primer has a viscosity less than 13 cPs, wherein the ink primer comprises: greater than or equal to 2 wt % and less than or equal to 10 wt % of an adhesion promoter configured to bond to glass; exposing the ink primer to a first light source to at least partially cure the ink primer; depositing an ink composition onto the ink primer at a second deposition temperature less than or less than or equal to 65° C. using a second inkjet printhead, wherein during the depositing, the ink composition has a viscosity less than 13 cPs; and exposing the ink composition to a second light source to at least partially cure the ink composition.

A fifty-seventh aspect A57 includes the method of the fifty-sixth aspect A56, wherein the first light source is an infrared light source.

A fifty-eighth aspect A58 includes the method of the fifty-sixth aspect A56, the first light source is an ultraviolet light source.

A fifty-ninth aspect A59 includes the method of the fifty-sixth aspect, wherein the ink primer further comprises: greater than 0 wt % and less than or equal to 10 wt % of a photoinitiator package, the photoinitiator package comprising a type I photoinitiator, a type II photoinitiator, and an amine synergist; and greater than or equal to 30 wt % and less than or equal to 45 wt % of a monofunctional monomer.

A sixtieth aspect A60 includes the method of any of the fifty-sixth through fifty-ninth aspects A56-A59, wherein the method further comprises, prior to depositing the ink composition, heating the ink primer at a first heating temperature greater than or equal to 25° C. and less than or equal to 150° C. for a time period greater than or equal to 1 second and less than or equal to 1 hour.

A sixty-first aspect A61 includes the method of any of the fifty-sixth aspect A56, fifty-eighth aspect A58, or fifty-ninth aspect A59, wherein the method further comprises, after depositing the ink composition, heating the ink primer and the ink compositions at a second heating temperature greater than or equal to 25° C. and less than or equal to 150° C. for a time period greater than or equal to 1 second and less than or equal to 1 hour.

Additional features and advantages of the photocurable inks and primers and glass articles comprising same described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
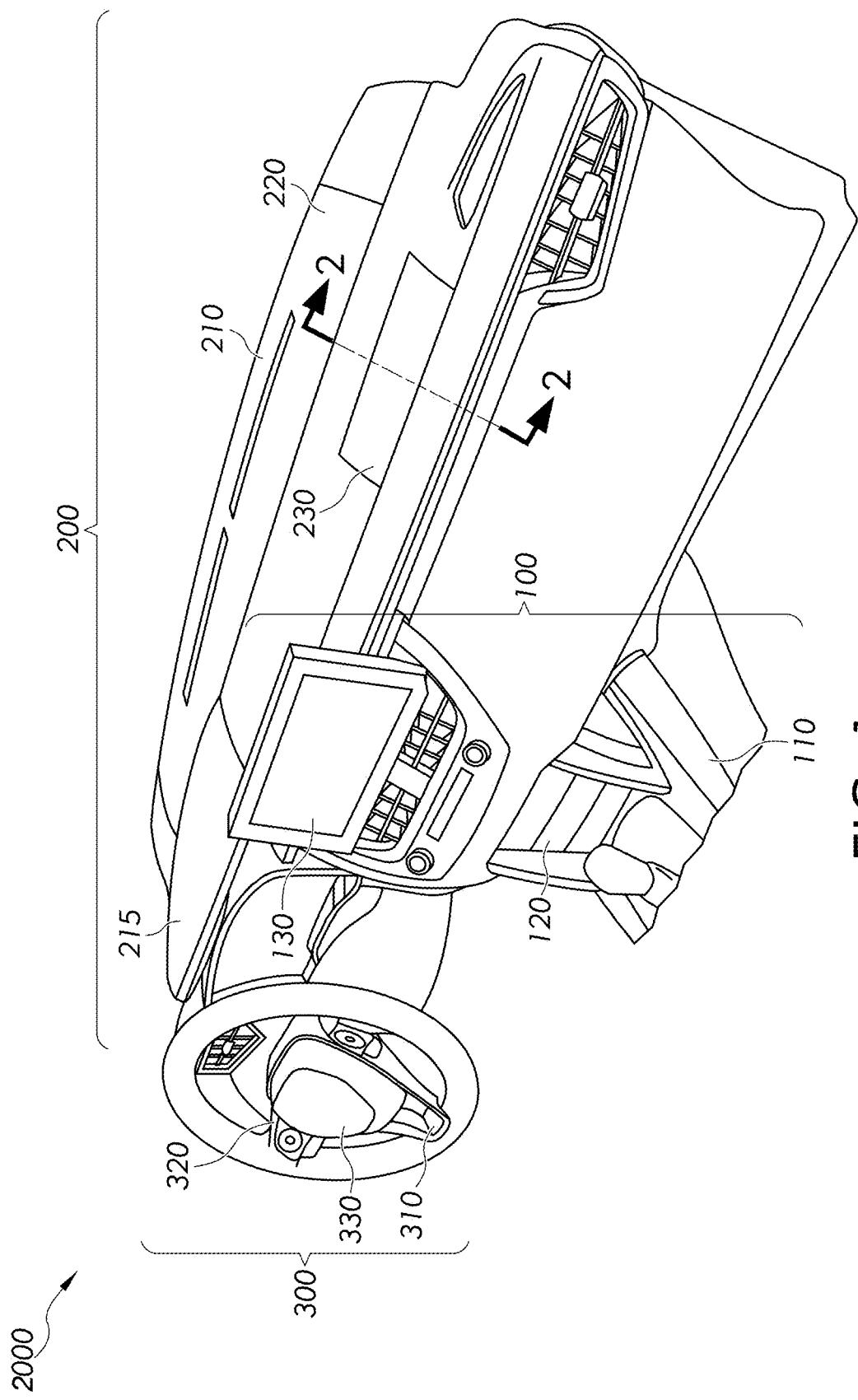
FIG. 1 is a perspective view of a vehicle interior with vehicle interior systems having displays, according to one or more embodiments of the present disclosure.

Reference will now be made in detail to various embodiments of photocurable inks and ink primers used to form opaque layers on display cover glass having relatively high adhesion to the glass and high optical density. In some embodiments, an ultraviolet ink composition includes, based on a total weight of the ultraviolet curable ink composition, greater than or equal to 25 wt % and less than or equal to 50 wt % of a pigment dispersion, greater than 0 wt % and less than or equal to 10 wt % of a photoinitiator package, greater than or equal to 10 wt % and less than or equal to 42 wt % of a reactive diluent, greater than or equal to 10 wt % and less than or equal to 20 wt % of a multifunctional monomer, and greater than or equal to 0 wt % and less than or equal to 35 wt % of a difunctional monomer. The pigment dispersion includes, based on a total weight of the pigment dispersion, at least 30 wt % of a pigment and a reactive monomer. The photoinitiator package includes a type I photoinitiator, a type II photoinitiator, and an amine synergist. The reactive diluent includes a viscosity less than 5 cPs at 25° C.

In other embodiments, a glass article includes a glass substrate having a first major surface and a second major surface, the second major surface being opposite the first major surface, and an opaque layer disposed on the second major surface. The opaque layer is disposed on the second major surface and includes a photocurable ink including at least 11 wt % of a pigment. The opaque layer is resin free and TPO free. The opaque layer comprises a thickness less than or equal to 15 μm and an optical density greater than or equal to 5.0. After curing solely via exposure to ultraviolet ("UV") radiation, the opaque layer exhibits a pencil hardness greater than or equal to 3H, when measured according to ASTM 3363, and an adhesion to the glass substrate greater than or equal to 4B, after being subjected to a temperature of 85° C. at 95% relative humidity for a period of at least 500 hours, when tested according to ASTM 3359.

In some embodiments, a method of fabricating a glass article includes depositing a plurality of sub-layers of an ultraviolet curable ink composition onto a first major surface of a glass substrate at a deposition temperature less than or equal to 65° C. using an inkjet printhead and, between deposition of adjacent ones of the plurality of sub-layers, pinning each of the plurality sub-layers by exposing the plurality of sub-layers to UV light from a UV light source to at least partially cure the ultraviolet curable ink composition making up that sub-layer. During the depositing, the photocurable ink has a viscosity less than 13 cPs. The ultraviolet curable ink composition includes, based on a total weight of the ultraviolet ink composition, greater than or equal to 25 wt % and less than or equal to 50 wt % of a pigment dispersion, greater than 0 wt % and less than or equal to 10 wt % of a photoinitiator package, greater than or equal to 10 wt % and less than or equal to 42 wt % of a reactive diluent, greater than or equal to 10 wt % and less than or equal to 20 wt % of a multifunctional monomer, and greater than or equal to 0 wt % and less than or equal to 35 wt % of a difunctional monomer. The pigment dispersion includes, based on a total weight of the pigment dispersion, at least 30 wt % of a pigment and a reactive monomer. The reactive diluent includes a viscosity less than 5 cPs at 25° C.

In other embodiments, an ink primer includes greater than or equal to 2 wt % and less than or equal to 10 wt % of an adhesion promoter configured to bond to glass and greater than or equal to 90 wt % and less than or equal to 98 wt % of a solvent configured to promote bonding of the adhesion promoter to the glass.

In some embodiments, an ink primer includes greater than or equal to 2 wt % and less than or equal to 10 wt % of an adhesion promoter configured to bond to glass, greater than 0 wt % and less than or equal to 10 wt % of a photoinitiator package, and greater than or equal to 30 wt % and less than or equal to 45 wt % of a monofunctional monomer. The photoinitiator package includes a type I photoinitiator, a type II photoinitiator, and an amine synergist.

In other embodiments, a glass article includes a glass substrate having a first major surface and a second major surface, the second major surface being opposite the first major surface, and an opaque layer disposed on the second major surface. The opaque layer includes an ink composition including at least 11 wt % of a pigment and an adhesion promoter. The adhesion promoter is bonded to the glass substrate and the ink composition is polymerized with the adhesion promoter. The opaque layer includes a thickness less than or equal to 15 μm and an optical density greater than or equal to 5.0. The opaque layer exhibits an adhesion to the glass substrate greater than or equal to 4B, after 500 1 hour cycles of being held at a temperature of −40° C. for 0.5 hours and a temperature of 95° C. for 0.5 hours.

In some embodiments, a method of fabricating a glass article includes depositing an ink primer onto a first major surface of a glass substrate at a first deposition temperature less than or less than or equal to 65° C. using a first inkjet printhead, exposing the ink primer to a first light source to at least partially cure the ink primer, depositing an ink composition onto the ink primer at a second deposition temperature less than or less than or equal to 65° C. using a second inkjet printhead, and exposing the ink composition to a second light source to at least partially cure the ink composition. During the depositing, the ink primer has a viscosity less than 13 cPs. The ink primer comprises greater than or equal to 2 wt % and less than or equal to 10 wt % of an adhesion promoter configured to bond to glass. During the depositing, the ink composition has a viscosity less than 13 cPs.

Various embodiments of photocurable inks and primers and glass articles comprising same will be described herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the "deposition temperature" refers to the temperature of an ink at ejection from a printhead.

As used herein, the "optical density" refers to how well a material reduces the power of light that passes through the material, per unit thickness, as measured with a densitometer.

As used herein, the "adhesion" refers to adhesion of a material after being subjected to the given conditions, when tested according to ASTM 3359.

As used herein, the "pencil hardness" is measured according to ASTM 3363.

As used herein, the "viscosity" is measured at the given temperature according to ASTM D445.

As used herein, the term "free" when used to describe the amount, concentration, or absence of a particular component in a composition or article, means that the component is not present in the composition or article.

Automotive interiors may include displays that include a display cover glass. A display module (e.g., a liquid crystal display ("LCD") module, an organic light emitting diode ("OLED") display module, or other suitable type of display module) may be laminated to or otherwise integrated with the cover glass such that the cover glass protects the display module and/or provides one or more performance enhancing attributes (e.g., anti-glare or anti-reflective properties) to the display module. A decorative ink may be applied to areas of the cover glass to conceal various components (e.g., electrical and mechanical connections) of the display and/or provide the display with a uniform appearance when the display is powered down.

Certain existing inks used for decorating display cover glass may suffer from various deficiencies rendering these inks unsuitable for automotive interior applications. For example, some existing inks may be applied through a screen-printing process, which may require multiple layers to provide a desired optical density. Such inks may have relatively low throughputs in production. Other existing inks (e.g., UV-curable inks) may fail to provide a desired optical density and/or provide adequate adhesion to the cover glass either initially or after being subjected to environmental testing associated with variable environmental conditions (e.g., in terms of temperature or humidity) that automotive interior components are exposed to. Adequate adhesion may be more difficult to achieve as the amount of pigment in the ink is increased.

Disclosed herein are ink compositions and ink primers which mitigate the aforementioned problems. Specifically, the UV photocurable inks described herein may be used to form opaque layers on display cover glass with high-throughput curing processes. Once the photocurable ink is cured, the opaque layer may have a relatively high adhesion to glass and high optical density. Regarding adhesion, the ink primers described herein including an adhesion promoter may be used to adequately adhere ink compositions including at least 11 wt % of a pigment to a glass substrate without compromising the desired post-cure thickness (e.g., less than 15 μm) and optical density (e.g., greater than 5) of the resulting opaque layer.

Ink Compositions

The ink compositions described herein may be used to form opaque layers on display cover glass having a desirable post-cure thickness (e.g., less than 15 μm) with high-throughput curing processes. Once the photocurable ink is cured, the opaque layer may have a relatively high adhesion to glass (e.g., greater than or equal to 4B) and high optical density (e.g., greater than 5). The terms "photocurable ink," "ink composition," and "photocurable ink composition" are used interchangeable throughout.

The ink compositions described herein may be ultraviolet curable ink compositions. The ink compositions may generally be described as comprising a pigment dispersion, a photoinitiator package, a reactive diluent, a multifunctional monomer, and, optionally, a difunctional monomer.

The pigment dispersion imparts the desired optical density to the resulting opaque layer. The ink composition may comprise a minimum amount of the pigment dispersion (e.g., greater than or equal to 25 wt %) to ensure that that the desired optical density (e.g., greater than 5) is achieved at the desired post-cure thickness (e.g., less than 15 μm). The amount of the pigment dispersion in the ink composition may be limited (e.g., less than or equal to 50 wt %) to ensure that the ink composition is curable. Accordingly, in embodiments, the ink composition may comprise, based on a total weight of the ink composition, greater than or equal to 25 wt % and less than or equal to 50 wt % of the pigment dispersion. In embodiments, the amount of the pigment dispersion in the ink composition may be, based on a total weight of the ink composition, greater than or equal to 25 wt %, greater than or equal to 30 wt %, or even greater than or equal to 35 wt %. In embodiments, the amount of the pigment dispersion in the ink composition may be, based on a total weight of the ink composition, less than or equal to 50 wt %, less than or equal to 45 wt %, or even less than or equal to 40 wt %. In embodiments, the amount of the pigment dispersion in the ink composition may be, based on a total weight of the ink composition, greater than or equal to 25 wt % and less than or equal to 50 wt %, greater than or equal to 25 wt % and less than or equal to 45 wt %, greater than or equal to 25 wt % and less than or equal to 40 wt %, greater than or equal to 30 wt % and less than or equal to 50 wt %, greater than or equal to 30 wt % and less than or equal to 45 wt %, greater than or equal to 30 wt % and less than or equal to 40 wt %, greater than or equal to 35 wt % and less than or equal to 50 wt %, greater than or equal to 35 wt % and less than or equal to 45 wt %, or even greater than or equal to 35 wt % and less than or equal to 40 wt %, or any and all sub-ranges formed from any of these endpoints.

In embodiments, the pigment dispersion comprises a pigment and a reactive monomer. In embodiments, the pigment may comprise carbon black, iron oxide, carbon nanotubes, graphene, carbon fibers, titanium oxide (black), or combinations thereof. In embodiments, the pigment may comprise C.I. Pigment Black 6, 7, 12, 20, 31, and 32; PO71; PO38; carbon black, titanium black; aniline black; anthraquinone black pigment; or combinations thereof. The pigment dispersion may comprise a minimum amount of pigment (e.g., at least 30 wt %) to ensure that that the desired optical density (e.g., greater than 5) is achieved at the desired post-cure thickness (e.g., less than 15 μm). The amount of the pigment in the pigment dispersion may be limited (e.g., less than or equal to 40 wt %) to preserve UV curability and flexibility in the composition space. Accordingly, in embodiments, the amount of pigment in the pigment dispersion may be, based on a total weight of the pigment dispersion, greater than or equal 30 wt %, greater than or equal to 33 wt %, or even greater than or equal to 35 wt %. In embodiments, the amount of the pigment in the pigment dispersion may be, based on a total weight of the pigment dispersion, less than or equal to 40 wt % or even less than or equal to 37 wt %. In embodiments, the amount of the pigment in the pigment dispersion may be, based on a total weight of the pigment dispersion, greater than or equal to 30 wt % and less than or equal to 40 wt %, greater than or equal to 30 wt % and less than or equal to 37 wt %, greater than or equal to 33 wt % and less than or equal to 40 wt %, greater than or equal to 33 wt % and less than or equal to 37 wt %, greater than or equal to 35 wt % and less than or equal to 40 wt %, or even greater than or equal to 35 wt % and less than or equal to 37 wt %, or any and all sub-ranges formed from any of these endpoints.

In embodiments, the ink composition may comprise, based on a total weight of the ink composition, at least 11 wt % of the pigment to facilitate the opaque layer formed therefrom having a relatively high optical density (e.g., greater than or equal to 5) at relatively low thicknesses (e.g., less than or equal to 15 μm, post curing). In embodiments, the amount of pigment in the ink composition may be, based on a total weight of the ink composition, greater than or equal to 11 wt %, greater than or equal to 13 wt %, greater than or equal to 15 wt %, greater than or equal to 17 wt %, or even greater than or equal to 20 wt %.

In embodiments, a remainder of the pigment dispersion comprises the reactive monomer. Accordingly, in embodiments, the amount of the reactive monomer in the pigment dispersion may be, based on a total weight of the pigment dispersion, greater than or equal to 60 wt % and less than or equal to 70 wt %, greater than or equal to 60 wt % and less than or equal to 67 wt %, greater than or equal to 60 wt % and less than or equal to 65 wt %, greater than or equal to 63 wt % and less than or equal to 70 wt %, greater than or equal to 63 wt % and less than or equal to 67 wt %, or even greater than or equal to 63 wt % and less than or equal to 65 wt %, or any and all sub-ranges formed from any of these endpoints.

In embodiments, the reactive monomer may comprise isobornyl acrylate, 1,6-hexanediol diacrylate, dipropylene glycol diacrylate, triethyleneglycol divinyl ether, ethylene glycol phenyl ether acrylate, propoxylated neopentyl glycol diacrylate, or combinations thereof.

The photoinitiator package of the ink composition facilitates curing of the ink composition, such as by using a UV LED. The ink composition may include a minimum amount of the photoinitiator package (e.g., greater than 0 wt %) to ensure curability of the ink composition. The amount of the photoinitiator package may be limited (e.g., less than or equal to 10 wt %) to preserve flexibility in the composition space for the remaining components while still providing favorable UV curing performance. Accordingly, in embodiments, the ink composition may comprise, based on a total weight of the ink composition, greater than 0 wt % and less than or equal to 10 wt % of the photoinitiator package. In embodiments, the amount of the photoinitiator package in the ink composition may be, based on a total weight of the ink composition, greater than 0 wt %, greater than or equal to 1 wt %, greater than or equal to 2 wt %, greater than or equal to 3 wt %, or even greater than or equal to 4 wt %. In embodiments, the amount of the photoinitiator package in the ink composition may be, based on a total weight of the ink composition, less than or equal to 10 wt %, or even less than or equal to 8 wt %. In embodiments, the amount of the photoinitiator package in the ink composition may be, based on a total weight of the ink composition, greater than 0 wt % and less than or equal to 10 wt %, greater than 0 wt % and less than or equal to 8 wt %, greater than or equal to 1 wt % and less than or equal to 10 wt %, greater than or equal to 1 wt % and less than or equal to 8 wt %, greater than or equal to 2 wt % and less than or equal to 10 wt %, greater than or equal to 2 wt % and less than or equal to 8 wt %, greater than or equal to 3 wt % and less than or equal to 10 wt %, greater than or equal to 3 wt % and less than or equal to 8 wt %, greater than or equal to 4 wt % and less than or equal to 10 wt %, or even greater than or equal to 4 wt % and less than or equal to 8 wt %, or any and all sub-ranges formed from any of these endpoints.

The photoinitiator package of the ink composition may comprise a type I photoinitiator, a type II photoinitiator, and an amine synergist.

In embodiments, the type I photoinitiator may comprise phenylbis(2,4,6-trimethyl benzoyl)phosphine oxide (e.g. Irgacure 819, available from BASF); 1-hydroxycyclohexyl-phenyl ketone (e.g. Irgacure 184 available from BASF); (2,6-dimethoxybenzoyl)-2,4,4-trimethylpentyl phosphine oxide (e.g. commercial blends Irgacure 1800, 1850, and 1700 available from BASF); 2,2-dimethoxyl-2-phenyl acetophenone (e.g. Irgacure 651, available from BASF); (2,4,6-trimethylbenzoyl)diphenyl phosphine oxide (e.g. Lucirin TPO available from BASF, Munich, Germany); ethoxy(2,4,6-trimethylbenzoyl)phenyl phosphine oxide (e.g. Lucirin TPO-L from BASF); or combinations thereof.

In embodiments, an amount of the type I photoinitiator in the ink composition may be, based on a total weight of the ink composition, greater than or equal to 2 wt % and less than or equal to 8 wt %, greater than or equal to 2 wt % and less than or equal to 6 wt %, greater than or equal to 4 wt % and less than or equal to 8 wt %, or even greater than or equal to 4 wt % and less than or equal to 6 wt %, or any and all sub-ranges formed from any of these endpoints.

In embodiments, the type II photoinitiator may comprise isopropylthioxanthone, benzophenone, 4-phenylbenzophenone, methyl-2-benzoylbenzoate, ketosulphone, or combinations thereof.

In embodiments, an amount of the type II photoinitiator in the ink composition may be, based on a total weight of the ink composition, greater than or equal to 1 wt % and less than or equal to 4 wt %, greater than or equal to 1 wt % and less than or equal to 3 wt %, greater than or equal to 2 wt % and less than or equal to 4 wt %, or even greater than or equal to 2 wt % and less than or equal to 3 wt %, or any and all sub-ranges formed from any of these endpoints. In embodiments, the amount of the type I photoinitiator in the ink composition may be greater than the amount of the type II photoinitiator to facilitate photopolymerization.

In embodiments, the amine synergist may comprise ethyl 4-(dimethylamino) benzoate; N, N-[2-(4-dimethylamino-benzoyl)oxyethylen-1-yl]methylamine; N-methyl diethanolamine; ethyl-4-dimethyl aminobenzoate; 2-ethylhexyl-4-dimethylaminobenzoate; or combinations thereof.

In embodiments, an amount of the amine synergist in the ink composition may be, based on a total weight of the ink composition, greater than or equal to 1 wt % and less than or equal to 4 wt %, greater than or equal to 1 wt % and less than or equal to 3 wt %, greater than or equal to 2 wt % and less than or equal to 4 wt %, or even greater than or equal to 2 wt % and less than or equal to 3 wt %, or any and all sub-ranges formed from any of these endpoints.

The reactive diluent of the ink composition imparts a relatively low viscosity (e.g., less than 5 cPs at 25° C.) to improve curing performance while also aiding in providing a low overall viscosity. In embodiments, the reactive diluent may comprise vinyl methyl oxazolidinone; 5-methyl-3-vinyloxazolidin-2-one; other N-vinyl monomers, such as N-vinylcarbazole, N-vinylindole derivatives, N-vinylpyrrolidone, N-vinylcaprolactam, N-vinylformamide, N-vinylacetoamide derivatives, N-vinyl(na)phthalimides, N-vinylimidazolium salts, and N-vinyltriazoles; or combinations thereof.

The ink composition may include a minimum amount of reactive diluent (e.g., greater than or equal to 10 wt %) to ensure that the ink composition will cure. Accordingly, in embodiments, the ink composition may comprise, based on a total weight of the ink composition, greater than or equal to 10 wt % and less than or equal to 42 wt % of a reactive diluent. In embodiments, the amount of the reactive diluent in the ink composition may be, based on a total weight of the ink composition, greater than or equal to 10 wt %, greater than or equal to 15 wt %, greater than or equal to 20 wt %, or even greater than or equal to 25 wt %. In embodiments, the amount of the reactive diluent in the ink composition may be, based on a total weight of the ink composition, less than or equal to 42 wt %, less than or equal to 40 wt %, less than or equal to 35 wt %, less than or equal to 30 wt %, less than or equal to 25 wt %, or even less than or equal to 20 wt %. In embodiments, the amount of the reactive diluent in the ink composition may be, based on a total weight of the ink composition, greater than or equal to 10 wt % and less than or equal to 42 wt %, greater than or equal to 10 wt % and less than or equal to 40 wt %, greater than or equal to 10 wt % and less than or equal to 35 wt %, greater than or equal to 10 wt % and less than or equal to 30 wt %, greater than or equal to 10 wt % and less than or equal to 25 wt %, greater than or equal to 10 wt % and less than or equal to 20 wt %, greater than or equal to 15 wt % and less than or equal to 42 wt %, greater than or equal to 15 wt % and less than or equal to 40 wt %, greater than or equal to 15 wt % and less than or equal to 35 wt %, greater than or equal to 15 wt % and less than or equal to 30 wt %, greater than or equal to 15 wt % and less than or equal to 25 wt %, greater than or equal to 15 wt % and less than or equal to 20 wt %, greater than or equal to 20 wt % and less than or equal to 42 wt %, greater than or equal to 20 wt % and less than or equal to 40 wt %, greater than or equal to 20 wt % and less than or equal to 35 wt %, greater than or equal to 20 wt % and less than or equal to 30 wt %, greater than or equal to 20 wt % and less than or equal to 25 wt %, greater than or equal to 25 wt % and less than or equal to 42 wt %, greater than or equal to 25 wt % and less than or equal to 40 wt %, greater than or equal to 25 wt % and less than or equal to 35 wt %, or even greater than or equal to 25 wt % and less than or equal to 30 wt %, or any and all sub-ranges formed from these endpoints.

The multifunctional monomer of the ink composition facilitates cure via high cross-linking, thereby increasing the mechanical properties of the resulting in the opaque layer. In embodiments, the multifunctional monomer may comprise dipentaerythritol hexaacrylate (e.g., M600 DPHA). Other suitable amide and acrylate compositions for use as the reactive diluent and the multifunctional monomer may be found in U.S. Pat. No. 7,423,105 B2, entitled "Fast Curing Primary Optical Fiber Coatings," hereby incorporated by reference in its entirety.

Examples of the multifunctional acrylate monomers that may be included in the ink composition include hexanediol diacrylate, trimethylolpropane triacrylate, pentaerythritol triacrylate, polyethylene glycol diacrylate (for example tetraethylene glycol diacrylate), dipropylene glycol diacrylate, tri(propylene glycol) triacrylate, neopentyl glycol diacrylate, bis(pentaerythritol) hexaacrylate, 3-methyl pentanediol diacrylate, and the acrylate esters of ethoxylated or propoxylated glycols and polyols, for example, propoxylated neopentyl glycol diacrylate, ethoxylated trimethylolpropane triacrylate, and mixtures thereof.

In addition, suitable multifunctional methacrylate monomers may also include esters of methacrylic acid (i.e. methacrylates), such as hexanediol dimethacrylate, trimethylolpropane trimethacrylate, triethyleneglycol dimethacrylate, diethyleneglycol dimethacrylate, ethyleneglycol dimethacrylate, 1,4-butanediol dimethacrylate, and mixtures thereof.

In embodiments, the multifunctional (meth)acrylate monomers may be selected from propoxylated neopentyl glycol diacrylate, ethoxylated trimethylolpropane triacrylate, dipropylene glycol diacrylate, tripropylene glycol diacrylate, and mixtures thereof.

The ink composition may comprise a minimum amount of multifunctional monomer (e.g., greater than or equal to 5 wt %) to ensure that the ink composition will cure. The amount of the multifunctional monomer may be limited (e.g., less than or equal to 20 wt %) to impart a relatively low viscosity and thereby preserve jettability. Accordingly, in embodiments, the ink composition may comprise, based on a total weight of the ink composition, greater than or equal to 5 wt % and less than or equal to 20 wt % of the multifunctional monomer. In embodiments, the amount of multifunctional monomer in the ink composition may be, based on a total weight of the ink composition, greater than or equal to 5 wt %, greater than or equal to 7 wt %, or even greater than or equal to 10 wt %. In embodiments, the amount of multifunctional monomer in the ink composition may be, based on a total weight of the ink composition, may be less than or equal to 20 wt %, less than or equal to 16 wt %, or even less than or equal to 12 wt %. In embodiments, the amount of the multifunctional monomer in the ink composition may be, based on a total weight of the ink composition, greater than or equal to 5 wt % and less than or equal to 20 wt %, greater than or equal to 5 wt % and less than or equal to 16 wt %, greater than or equal to 5 wt % and less than or equal to 12 wt %, greater than or equal to 7 wt % and less than or equal to 20 wt %, greater than or equal to 7 wt % and less than or equal to 16 wt %, greater than or equal to 7 wt % and less than or equal to 12 wt %, greater than or equal to 10 wt % and less than or equal to 20 wt %, greater than or equal to 10 wt % and less than or equal to 16 wt %, or even greater than or equal to 10 wt % and less than or equal to 12 wt %, or any and all sub-ranges formed from any of these endpoints.

The ink composition may further comprise a difunctional monomer to build mechanical properties while maintaining low viscosity. In embodiments, the difunctional monomer may comprise difunctional acrylates and methacrylates, such as 3-methyl-1,5-pentanediyl diacrylate, dipropylene glycol diacrylate, or combinations thereof. In embodiments, the ink composition may comprise, based on a total weight of the ink composition, greater than or equal to greater than or equal to 0 wt % and less than or equal to 35 wt % of the difunctional monomer. In embodiments, the ink composition may comprise, based on a total weight of the ink composition, greater than or equal to greater than or equal to 10 wt % and less than or equal to 35 wt % of the difunctional monomer. In embodiments, the amount of the difunctional monomer in the ink composition may be, based on a total weight of the ink composition, greater than or equal to 0 wt %, greater than or equal to 5 wt %, greater than or equal to 10 wt %, or even greater than or equal to 15 wt %. In embodiments, the amount of the difunctional monomer in the ink composition may be, based on a total weight of the ink composition, less than or equal to 35 wt %, less than or equal to 25 wt %, or even less than or equal to 15 wt %. In embodiments, the amount of the difunctional monomer in the ink composition may be, based on a total weight of the ink composition, greater than or equal to 0 wt % and less than or equal to 35 wt %, greater than or equal to 0 wt % and less than or equal to 25 wt %, greater than or equal to 0 wt % and less than or equal to 15 wt %, greater than or equal to 5 wt % and less than or equal to 35 wt %, greater than or equal to 5 wt % and less than or equal to 25 wt %, greater than or equal to 5 wt % and less than or equal to 15 wt %, greater than or equal to 10 wt % and less than or equal to 35 wt %, greater than or equal to 10 wt % and less than or equal to 25 wt %, greater than or equal to 10 wt % and less than or equal to 15 wt %, greater than or equal to 15 wt % and less than or equal to 35 wt %, or even greater than or equal to 15 wt % and less than or equal to 25 wt %, or any and all sub-ranges formed from any of these endpoints.

The relative amounts of the reactive diluent, the multifunctional monomer, and the difunctional monomer may be tailored based on the characteristics of the reactive monomer in the pigment dispersions. That is, the amount of the difunctional monomer relative to the reactive diluent and the particular difunctional monomer used may be based on the viscosity and reactivity of the reactive monomer in the pigment dispersion, as exemplified in the Examples section below.

In embodiments, a combined amount of the reactive diluent, the multifunctional monomer, and the difunctional monomer may be less than or equal to 60 wt % to achieve a relatively low viscosity (e.g., less than 5 cPs at 25° C.) while providing enough composition space for other components to facilitate UV curability and to achieve the desired optical density (e.g., greater than 5). In embodiments, a combined amount of the reactive diluent, the multifunctional monomer, and the difunctional monomer may be less than or equal to 60 wt %, less than or equal to 50 wt %, less than or equal to 40 wt %, or even less than or equal to 30 wt %.

The ink composition may further comprise an adhesion promoter to facilitate the inks binding to the glass without the use of a primer. Suitable adhesion promoters can include 3-(methacryloyloxy)propyltrimethoxysilane, 3-(acryloyloxy)propyltrimethoxysilane, (3-mercaptopropyl)trimethoxysilane, and allyltrimethylsilane and any other acrylated silane. Other suitable adhesion promoters can be found in U.S. patent application Ser. No. 15/337,459, filed on Oct. 28, 2016, hereby incorporated by reference in its entirety. In embodiments, ink composition further comprises greater than 0 wt % and less than or equal to 10 wt % of the adhesion promoter.

In embodiments, the ink compositions described herein are free of resin, which aids in maintaining a low viscosity suitable for inkjet printing, and free of TPO, which is a requirement for REACH compliance.

The ink compositions described herein may also satisfy various environmental compliance standards. For example, in embodiments, the ink compositions described herein may contain less than 10 wt % volatile organic compounds, thus satisfying GB 35807-2020, entitled "Limits of Volatile Organic Compounds (VOCs) in Printing Ink," hereby incorporated by reference in its entirety. Moreover, the ink compositions described herein may be free of halogenated hydrocarbon and free of the solvents identified by CAS Registry Number in Table 1.

TABLE 1

| | Component | CAS |
|---|---|---|
| 1 | Ethylbenzene | 100-41-4 |
| 2 | Propylene oxide (Oxirane, methyl-) | 75-56-9 |
| 3 | Styrene (Benzene, ethenyl-) | 100-42-5 |
| 4 | benzene | 71-43-2 |
| 5 | Isopropyl nitrite | 541-42-4 |

TABLE 1-continued

| | Component | CAS |
|---|---|---|
| 6 | Butyl nitrite | 544-16-1 |
| 7 | Ethylene glycol monoethyl ether (2-Ethoxyethanol) | 110-80-5 |
| 8 | Ethylene glycol ether acetate | 111-15-9 |
| 9 | Ethylene glycol monomethyl ether (2-Methoxyethanol) | 109-86-4 |
| 10 | Ethylene glycol formaldehyde acetate (2-Methoxyethyl Acetate) | 110-49-6 |
| 11 | 2-nitropropane | 79-46-9 |
| 12 | N-methyl-2-pyrrolidone | 872-50-4 |
| 13 | Triethylene glycol dimethyl ether | 112-49-2 |
| 14 | Ethylene glycol dimethyl ether | 110-71-4 |
| 15 | Ethylene glycol diethyl ether | 629-14-1 |
| 16 | Toluene | 108-88-3 |
| 17 | Xylene | 1330-20-7 |

Such solvents are known to have potentially harmful effects on the environment and/or human health. Certain existing ink compositions incorporate the solvents listed in Table 1 in order to provide UV-curable inks with relatively high optical densities that are compatible with inkjet printing. The ink compositions described herein provide such favorable attributes without such harmful solvents. The ink compositions of the present disclosure provide un-cured viscosities suitable for inkjet printing without the addition of harmful solvents, and thus facilitate relatively high throughput (e.g., greater than 20 m$^2$/hour, greater than 30 m$^2$/hour, greater than 40 m$^2$/hour, greater than 50 m$^2$/hour) printing process with commercially available printheads. Inkjet printing processes are beneficially compatible with chemically strengthened cover glass, unlike certain other inks based on ceramic frits that require relatively high curing temperatures.

In embodiments, the ink compositions may have a viscosity greater than or equal to 1 cPs and less than or equal to 100 cPs over a temperature range from 30° C. to 50° C. In embodiments, the ink compositions described herein may be compatible with commercially available inkjet printing processes (e.g., have an un-cured viscosity of less than 25 cPs at temperatures less than or equal to 60° C., or from 30° C. to 50° C.) to facilitate relatively low-cost, high throughout production processes. In embodiments, the ink composition may exhibit a viscosity greater than or equal to 8 cPs and less than or equal to 13 cPs over a temperature range from 30° C. to 50° C.

Ink Primers

As discussed herein, it may be more difficult to achieve adequate adhesion of an ink composition to a glass substrate as the amount of the pigment in the ink composition is increased. The ink primers described herein include an adhesion promoter to adequately adhere ink compositions including at least 11 wt % of a pigment to a glass substrate without compromising the desired post-cure thickness (e.g., less than 15 μm) and optical density (e.g., greater than 5) of the resulting opaque layer. While the ink primers described herein may be discussed with respect to the ink compositions described herein, one skilled in the art would appreciate that other suitable ink compositions may be used in combination with the disclosed ink primers.

In embodiments, the ink primers described herein may be free of resin, which aids in maintaining a low viscosity suitable for inkjet printing, and free of TPO, which is a requirement for REACH compliance.

In embodiments, the ink primers may have a viscosity greater than or equal to 1 cPs and less than or equal to 100 cPs over a temperature range from 30° C. to 50° C. In embodiments, the ink primers described herein may be compatible with commercially available inkjet printing processes (e.g., have an un-cured viscosity of less than 25 cPs at temperatures less than or equal to 60° C., or from 30° C. to 50° C.) to facilitate relatively low-cost, high throughout production processes. In embodiments, the ink composition may exhibit a viscosity greater than or equal to 8 cPs and less than or equal to 13 cPs over a temperature range from 30° C. to 50° C.

Infrared Curable Ink Primer

In some embodiments, the ink primer may generally be described as comprising an adhesion promoter and a solvent, such as an infrared curable ink primer. The adhesion promoter may be configured to bond to glass and the solvent may be configured to promote bonding of the adhesion promoter to the glass. For example, for adequate bonding, hydrolysis and condensation of silane molecules of an adhesion promoter should occur on the glass so that the silane molecules form a covalently bound layer to the surface. The polymerization of the silane prior to deposition may affect the performance of the final ink primer. As such, a solvent should be selected such that the silane molecules do not hydrolyze and condense with neighboring silane molecules to form oligomeric aggregates.

The adhesion promoter may comprise an organofunctional silane. Suitable adhesion promoters can be found in U.S. patent application Ser. No. 15/337,459, filed on Oct. 28, 2016. For example, in embodiments, the adhesion promoter is an organofunctional silane compound having the general formula $R_nSiX_{4-n}$, where R is a non-hydrolyzable organic group that possesses a functionality which enables the adhesion promoter to physically or chemically interact with organic resins and polymers, X is a hydrolyzable group, such as alkoxy, acyloxy, amine or a halogen such as chlorine, and n is an integer ranging from 0 to 4 or from 1 to 3.

Representative organofunctional silane adhesion promoters include, but are not limited to, alkyltrialkoxysilanes, methyltriethoxysilane, methyltrimethoxysilane, octyltrimethoxysilane, octadecyltrimethoxysilane, polyalkoxysiloxane compounds, aminoalkyltrialkoxysilane, γ-aminopropyltriethoxysilane, γ-aminopropyltrimethoxysilane, N-β-(aminoethyl)-γ-aminopropyltrimethoxysilane, γ-ureido propyltriethoxysilane, N-(2-aminoethyl)-3-aminopropyltrimethoxysilane, 13-(3,4-epoxycyclohexyl)ethyltrimethoxysilane, γ-glycidoxy propyltrimethoxysilane, epoxypropyltrimethoxysilane, γ-mercaptopropyltriethoxysilane, mercaptoalkyltrialkoxysilane, γ-mercaptopropyltrimethoxysilane, N-methylaminopropyl-trimethoxysilane, 3-azidopropyltriethoxysilane, 3-acryloxypropyltrimethoxylsilane, 3-methacryloxypropyltrimethoxysilane, and 1,4-bis (trimethoxysilylethyl)benzene.

The ink primer may have a minimum amount of adhesion promoter (e.g., greater than or equal to 2 wt %) to ensure adequate adhesion. Accordingly, in embodiments, the ink primer may comprise, based on a total weight of the ink primer, greater than or equal to 2 wt % and less than or equal to 10 wt % of the adhesion promoter. In embodiments, the amount of the adhesion promoter in the ink primer may be, based on a total weight of the ink primer, greater than or equal to 2 wt %, greater than or equal to 4 wt %, or even greater than or equal to 6 wt %. In embodiments, the amount of the adhesion promoter in the ink primer may be based on a total weight of the ink primer, less than or equal to 10 wt % or even less than or equal to 8 wt %. In embodiments, the amount of the adhesion promoter in the ink primer may be, based on a total weight of the ink primer, greater than or equal to 2 wt % and less than or equal to 10 wt %, greater than or equal to 2 wt % and less than or equal to 8 wt %, greater than or equal to 4 wt % and less than or equal to 10 wt %, greater than or equal to 4 wt % and less than or equal to 8 wt %, greater than or equal to 6 wt % and less than or equal to 10 wt %, or even greater than or equal to 6 wt % and less than or equal to 8 wt %, or any and all sub-ranges formed from any of these endpoints.

In embodiments, the solvent may comprise 3-methoxy-3-methyl-1-butanol; butanol; ethylene glycol ether (e.g., ethylene glycol monoethyl ether and diethylene glycol diethyl ether); 2-butoxy ethanol; propylene glycol monomethyl ether acetate; propylene glycol; 2-butoxy ethyl acetate; ethylene glycol; 1,4-butane diol; diethyl succinate; or combinations thereof.

In embodiments, the ink primer may comprise, based on a total weight of the ink primer, greater than or equal to 90 wt % and less than or equal to 98 wt % of the solvent. In embodiments, the amount of the solvent in the ink primer may be, based on a total weight of the ink primer, greater than or equal to 90 wt % or even greater than or equal to 92 wt %. In embodiments, the amount of the solvent in the ink primer may be, based on a total weight of the ink primer, less than or equal to 98 wt %, less than or equal to 96 wt %, or even less than or equal to 94 wt %. In embodiments, the amount of the solvent in the ink primer may be, based on a total weight of the ink primer, greater than or equal to 90 wt % and less than or equal to 98 wt %, greater than or equal to 90 wt % and less than or equal to 96 wt %, greater than or equal to 90 wt % and less than or equal to 94 wt %, greater than or equal to 92 wt % and less than or equal to 98 wt %, greater than or equal to 92 wt % and less than or equal to 96 wt %, or even greater than or equal to 92 wt % and less than or equal to 94 wt %, or any and all sub-ranges formed from any of these endpoints.

Ultraviolet Curable Ink Primers

In other embodiments, the ink primer may generally be described as comprising an adhesion promoter, a photoinitiator package, and a monofunctional monomer, such as an ultraviolet curable ink primer.

The type and/or amount of adhesion promoter in the ultraviolet curable ink primer may be the same as or similar to the type and/or amount of adhesion promoter described hereinabove with respect to the infrared curable ink primer. For example, in embodiments, the ink primer may comprise, based on a total weight of the ink primer, greater than or equal to 2 wt % and less than or equal to 10 wt % of the adhesion promoter. In embodiments, the adhesion promoter may comprise an organofunctional silane.

The photoinitiator package of the ink primer facilitates curing of the ink primer, such as by using a UV LED. The ink primer may include a minimum amount of the photoinitiator package (e.g., greater than 0 wt %) to ensure curability of the ink primer. The amount of the photoinitiator package may be limited (e.g., less than or equal to 10 wt %) to preserve flexibility in the composition space for the remaining components while still providing favorable UV curing performance. Accordingly, in embodiments, the ink primer may comprise, based on a total weight of the ink composition, greater than 0 wt % and less than or equal to 10 wt % of the photoinitiator package. In embodiments, the amount of the photoinitiator package in the ink primer may be, based on a total weight of the ink primer, greater than 0 wt %, greater than or equal to 1 wt %, greater than or equal to 2 wt %, greater than or equal to 3 wt %, or even greater than or equal to 4 wt %. In embodiments, the amount of the photoinitiator package in the ink primer may be, based on a total weight of the ink primer, less than or equal to 10 wt %, or even less than or equal to 8 wt %. In embodiments, the amount of the photoinitiator package in the ink primer may be, based on a total weight of the ink primer, greater than 0 wt % and less than or equal to 10 wt %, greater than 0 wt % and less than or equal to 8 wt %, greater than or equal to 1 wt % and less than or equal to 10 wt %, greater than or equal to 1 wt % and less than or equal to 8 wt %, greater than or equal to 2 wt % and less than or equal to 10 wt %, greater than or equal to 2 wt % and less than or equal to 8 wt %, greater than or equal to 3 wt % and less than or equal to 10 wt %, greater than or equal to 3 wt % and less than or equal to 8 wt %, greater than or equal to 4 wt % and less than or equal to 10 wt %, or even greater than or equal to 4 wt % and less than or equal to 8 wt %, or any and all sub-ranges formed from any of these endpoints.

The photoinitiator package of the ink primer may comprise a type I photoinitiator, a type II photoinitiator, and an amine synergist.

In embodiments, the type I photoinitiator may comprise phenylbis(2,4,6-trimethyl benzoyl)phosphine oxide (e.g. Irgacure 819, available from BASF); 1-hydroxycyclohexyl-phenyl ketone (e.g. Irgacure 184 available from BASF); (2,6-dimethoxybenzoyl)-2,4,4-trimethylpentyl phosphine oxide (e.g. commercial blends Irgacure 1800, 1850, and 1700 available from BASF); 2,2-dimethoxy-2-phenyl acetophenone (e.g. Irgacure 651, available from BASF); (2,4,6-trimethylbenzoyl)diphenyl phosphine oxide (e.g. Lucirin TPO available from BASF, Munich, Germany); ethoxy(2,4,6-trimethylbenzoyl)phenyl phosphine oxide (e.g. Lucirin TPO-L from BASF); or combinations thereof.

In embodiments, an amount of the type I photoinitiator in the ink primer may be, based on a total weight of the ink primer, greater than or equal to 2 wt % and less than or equal to 8 wt %, greater than or equal to 2 wt % and less than or equal to 6 wt %, greater than or equal to 4 wt % and less than or equal to 8 wt %, or even greater than or equal to 4 wt % and less than or equal to 6 wt %, or any and all sub-ranges formed from any of these endpoints.

In embodiments, the type II photoinitiator may comprise isopropylthioxanthone, benzophenone, 4-phenylbenzophenone, methyl-2-benzoylbenzoate, ketosulphone, or combinations thereof.

In embodiments, an amount of the type II photoinitiator in the ink primer may be, based on a total weight of the ink primer, greater than or equal to 1 wt % and less than or equal to 4 wt %, greater than or equal to 1 wt % and less than or equal to 3 wt %, greater than or equal to 2 wt % and less than or equal to 4 wt %, or even greater than or equal to 2 wt % and less than or equal to 3 wt %, or any and all sub-ranges formed from any of these endpoints. In embodiments, the amount of the type I photoinitiator in the ink primer is greater than the amount of the type II phototinitiator to facilitate photopolymerization.

In embodiments, the amine synergist may comprise ethyl 4-(dimethylamino) benzoate; N, N-[2-(4-dimethylamino-benzoyl)oxyethylen-1-yl]methylamine; N-methyl diethanolamine; ethyl-4-dimethyl aminobenzoate; 2-ethylhexyl-4-dimethylaminobenzoate; or combinations thereof.

In embodiments, an amount of the amine synergist in the ink primer may be, based on a total weight of the ink primer, greater than or equal to 1 wt % and less than or equal to 4 wt %, greater than or equal to 1 wt % and less than or equal to 3 wt %, greater than or equal to 2 wt % and less than or equal to 4 wt %, or even greater than or equal to 2 wt % and less than or equal to 3 wt %, or any and all sub-ranges formed from any of these endpoints.

The monofunctional monomer of the ink primer lowers viscosity and reduces crosslinking such that acrylates of the ink primer may be copolymerized with a subsequent ink layer. This is different than the ink composition described herein, which may include a multifunctional monomer to facilitate cure via high cross-linking, thereby increasing the mechanical properties of the resulting opaque layer.

In embodiments, the monofunctional monomer may comprise isobornyl acrylate. Other suitable monofunctional monomers can be found in U.S. patent application Ser. No. 15/337,459, filed on Oct. 28, 2016. For example, exemplary monofunctional monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate (e.g. SR440 available from Sartomer Company, Inc. and Ageflex FA8 available from CPS Chemical Co.), 2-ethylhexyl acrylate, nonyl acrylate, decyl acrylate, isodecyl acrylate (e.g. SR395 available from Sartomer Company, Inc.; and Ageflex FA10 available from CPS Chemical Co.), undecyl acrylate, dodecyl acrylate, tridecyl acrylate (e.g. SR489 available from Sartomer Company, Inc.), lauryl acrylate (e.g. SR335 available from Sartomer Company, Inc., Ageflex FA12 available from CPS Chemical Co. (Old Bridge, N.J.), and Photomer 4812 available from IGM Resins), octadecyl acrylate, and stearyl acrylate (e.g. SR257 available from Sartomer Company, Inc.); aminoalkyl acrylates such as dimethylaminoethyl acrylate, diethylaminoethyl acrylate, and 7-amino-3,7-dimethyloctyl acrylate; alkoxyalkyl acrylates such as butoxylethyl acrylate, phenoxyethyl acrylate (e.g. SR339 available from Sartomer Company, Inc., Ageflex PEA available from CPS Chemical Co., and Photomer 4035 available from IGM Resins), phenoxyglycidyl acrylate (e.g. CN131 available from Sartomer Company, Inc.), lauryloxyglycidyl acrylate (e.g. CN130 available from Sartomer Company, Inc.), and ethoxyethoxyethyl acrylate (e.g. SR256 available from Sartomer Company, Inc.); single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g. SR423 and SR506 available from Sartomer Company, Inc., and Ageflex IBOA available from CPS Chemical Co.), tetrahydrofurfuryl acrylate (e.g. SR285 available from Sartomer Company, Inc.), caprolactone acrylate (e.g. SR495 available from Sartomer Company, Inc.; and Tone M100 available from Union Carbide Company, Danbury, Conn.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g. Photomer 4003 available from IGM Resins; and SR504 available from Sartomer Company, Inc.) and propoxylatednonylphenol acrylate (e.g. Photomer 4960 available from IGM Resins); acrylamides such as diacetone acrylamide, isobutoxymethyl acrylamide, N,N'-dimethylaminopropyl acrylamide, N,N-dimethyl acrylamide, N,N-diethyl acrylamide, and t-octyl acrylamide; vinylic compounds such as N-vinylpyrrolidone and N-vinylcaprolactam (both available from Ashland Inc., Covington, Ky.); and acid esters such as maleic acid ester and fumaric acid ester.

The ink primer may comprise a minimum amount of the monofunctional monomer (e.g., greater than or equal to 30 wt %) to achieve a relatively low viscosity and a tackiness. The amount of the monofunctional monomer may be limited (e.g., less than or equal to 45 wt %) such that the ink primer and the resulting opaque layer are not too soft and have desirable mechanical properties. Accordingly, in embodiments, the ink primer may comprise, based on a total weight of the ink primer, greater than or equal to 30 wt % and less than or equal to 45 wt % of the monofunctional monomer. In embodiments, the amount of the monofunctional monomer in the ink primer may be, based on a total weight of the ink primer, greater than or equal to 30 wt % or even greater than or equal 35 wt %. In embodiments, the amount of the monofunctional monomer in the ink primer may be, based on a total weight of the ink primer, less than or equal to 45 wt % or even less than or equal to 40 wt %. In embodiments, the amount of the monofunctional monomer in the ink primer may be, based on a total weight of the ink primer, greater than or equal to 30 wt % and less than or equal to 45 wt %, greater than or equal to 30 wt % and less than or equal to 40 wt %, greater than or equal to 35 wt % and less than or equal to 45 wt %, or even greater than or 35 wt % and less than or equal to 40 wt %, or any and all sub-ranges formed from any of these endpoints.

The ink primer may further comprise a reactive diluent to impart a relatively low viscosity (e.g., less than 5 cPs at 25° C.) to improve curing performance while also aiding in providing a low overall viscosity. In embodiments, the reactive diluent may comprise vinyl methyl oxazolidinone; 5-methyl-3-vinyloxazolidin-2-one; other N-vinyl monomers, such as N-vinylcarbazole, N-vinylindole derivatives, N-vinylpyrrolidone, N-vinylcaprolactam, N-vinylformamide, N-vinylacetoamide derivatives, N-vinyl(na)phthalimides, N-vinylimidazolium salts, and N-vinyltriazoles; or combinations thereof.

The ink primer may include a minimum amount of reactive diluent (e.g., greater than 0 wt %) to ensure that the ink composition will cure. Accordingly, in embodiments, the ink primer may comprise, based on a total weight of the ink primer, greater than 0 wt % and less than or equal to 30 wt % of the reactive diluent. In embodiments, the amount of the reactive diluent in the ink primer may be, based on a total weight of the ink primer, greater than or equal to 0 wt %, greater than or equal to 5 wt %, greater than or equal to 10 wt %, or even greater than or equal to 15 wt %. In embodiments, the amount of the reactive diluent in the ink primer may be, based on a total weight of the ink primer, less than or equal to 30 wt % or even less than or equal to 25 wt %. In embodiments, the amount of the reactive diluent in the ink primer may be, based on a total weight of the ink primer, greater than or equal to 0 wt % and less than or equal to 30 wt %, greater than or equal to 0 wt % and less than or equal 25 wt %, greater than or equal to 5 wt % and less than or equal to 30 wt %, greater than or equal to 5 wt % and less than or equal 25 wt %, greater than or equal to 10 wt % and less than or equal to 30 wt %, greater than or equal to 10 wt % and less than or equal 25 wt %, greater than or equal to 15 wt % and less than or equal to 30 wt %, or even greater than or equal to 15 wt % and less than or equal 25 wt %, or any and all sub-ranges formed from any of these endpoints.

The ink primer may further comprise a difunctional monomer to build mechanical properties while maintaining low viscosity. In embodiments, the difunctional monomer may comprise difunctional acrylates and methacrylates, such as 3-methyl-1,5-pentanediyl diacrylate, dipropylene glycol diacrylate, or combinations thereof. In embodiments, the ink primer may comprise, based on a total weight of the ink primer, greater than or equal to greater than or equal to 0 wt % and less than or equal to 35 wt % of the difunctional monomer. In embodiments, the amount of the difunctional monomer in the ink primer may be, based on a total weight of the ink primer, greater than or equal to 0 wt %, greater than or equal to 5 wt %, greater than or equal to 10 wt %, or even greater than or equal to 15 wt %. In embodiments, the amount of the difunctional monomer in the ink primer may be, based on a total weight of the ink primer, less than or equal to 35 wt %, less than or equal to 25 wt %, or even less than or equal to 15 wt %. In embodiments, the among of the difunctional monomer in the ink primer may be, based on a total weight of the ink primer, greater than or equal to 0 wt % and less than or equal to 35 wt %, greater than or equal to 0 wt % and less than or equal to 25 wt %, greater than or equal to 0 wt % and less than or equal to 15 wt %, greater than or equal to 5 wt % and less than or equal to 35 wt %, greater than or equal to 5 wt % and less than or equal to 25 wt %, greater than or equal to 5 wt % and less than or equal to 15 wt %, greater than or equal to 10 wt % and less than or equal to 35 wt %, greater than or equal to 10 wt % and less than or equal to 25 wt %, greater than or equal to 10 wt % and less than or equal to 15 wt %, greater than or equal to 15 wt % and less than or equal to 35 wt %, or even greater than or equal to 15 wt % and less than or equal to 25 wt %, or any and all sub-ranges formed from any of these endpoints.

The ink primer may further comprise a solvent. The type of solvent in the ultraviolet curable ink primer may be the same as or similar to the type of solvent described hereinabove with respect to the infrared ink primer. For example, in embodiments, the ink primer may comprise 3-methoxy-3-methyl-1-butanol; butanol; ethylene glycol monoethyl ether; 2-butoxy ethanol; propylene glycol monomethyl ether acetate; propylene glycol; 2-butoxy ethyl acetate; diethylene glycol diethyl ether; ethylene glycol; 1,4-butane diol; diethyl succinate; ethylene glycol ethers; or combinations thereof.

In embodiments, the ink primer may comprise, based on a total weight of the ink primer, greater than or equal to 5 wt % and less than or equal to 10 wt % of the solvent.

Glass Articles

Referring now to FIG. 1, a vehicle interior 2000 including three different vehicle interior systems 100, 200, 300 is shown. Vehicle interior system 100 includes a center console base 110 with a curved surface 120 including a display 230. Vehicle interior system 200 includes a dashboard base 210 with a curved surface 220 including a display 230. The dashboard base 210 typically includes an instrument panel 215 which may also include a curved display. Vehicle interior system 300 includes a dashboard steering wheelbase 310 with a curved surface 320 and a display 330. In embodiments, the vehicle interior system may include a base that is an arm rest, a pillar, a seat back, a floorboard, a headrest, a door panel, or any portion of the interior of a vehicle that includes a curved surface. In embodiments, the displays 130, 230, 330 are flat and comprise cover glass with planar major surfaces. In embodiments, one or more of the displays 130, 230, 330 are curved, and the curved display may include curved cover glass that may be hot-formed or cold-formed to possess such curvature. For example, such embodiments may incorporate opaque layers formed of the photocurable ink compositions described herein disposed on cold-formed glass substrates. Such cold-forming may involve any of the techniques described in U.S. Pre-Grant Publication No. 2019/0329531 A1, entitled "Laminating thin strengthened glass to curved molded plastic surface for decorative and display cover application," U.S. Pre-Grant Publication No. 2019/0315648 A1, entitled "Cold-formed glass article and assembly process thereof," U.S. Pre-Grant Publication No. 2019/0012033 A1, entitled "Vehicle interior systems having a curved cover glass and a display or touch panel and methods for forming the same," and U.S. patent application Ser. No. 17/214,124, entitled "Curved glass constructions and methods for forming same," which are hereby incorporated by reference in their entireties.

The embodiments of the glass articles described herein may be used in any or all of vehicle interior systems 100, 200 and 300. While FIG. 1 shows an automobile interior, the various embodiments of the vehicle interior system may be incorporated into any type of vehicle such as trains, automobiles (e.g., cars, trucks, buses and the like), seacraft (boats, ships, submarines, and the like), and aircraft (e.g., drones, airplanes, jets, helicopters and the like), including both human-piloted vehicles, semi-autonomous vehicles and fully autonomous vehicles. Further, while the description herein relates primarily to the use of the glass articles in vehicle displays, it should be understood that various embodiments discussed herein may be used in any type of display application.

Figure 2:
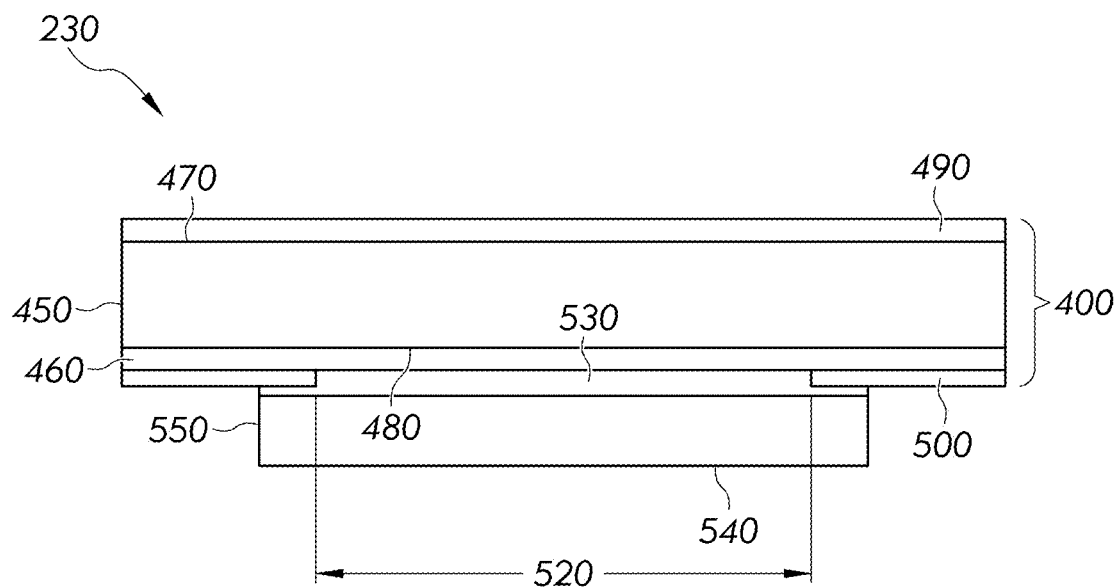
FIG. 2 schematically depicts a cross-sectional view of a display of a vehicle interior system through the line 2-2 depicted in FIG. 1, according to one or more embodiments of the present disclosure.

FIG. 2 schematically depicts a cross-sectional view of the display 230 through the line 2-2 of FIG. 1, according to an example embodiment where the display 230 is flat. While FIG. 2 depicts an example of the display 230, it should be understood that the displays 130, 330 described herein with respect to FIG. 1 may have similar cross-sectional structures and incorporate the photocurable inks described herein in a similar manner. While the display 230 is flat in the embodiment depicted in FIG. 2, embodiments are also envisioned where the display 230 is curved and the glass article 400 comprises one or more curved surfaces (e.g., as a result of being cold-formed or hot-formed to have a suitable curved shape).

As shown in FIG. 2, the glass article 400 comprises at least a substrate 450 and an opaque layer 500, and optionally includes a light management layer 460. The substrate 450 has a first major surface 470 facing a viewer and a second major surface 480 upon which the opaque layer 500 is, at least in part, disposed. As used herein, the term "dispose" includes coating, depositing and/or forming a material onto a surface using any known method in the art. The disposed material may constitute a layer, as defined herein. As used herein, the phrase "disposed on" includes the instance of forming a material onto a surface such that the material is in direct contact with the surface and also includes the instance where the material is formed on a surface, with one or more intervening material(s) is between the disposed material and the surface. The intervening material(s) may constitute a layer, as defined herein. The term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments, a layer may include one or more contiguous and uninterrupted layers and/or one or more discontinuous and interrupted layers (i.e., a layer having different materials formed adjacent to one another). A layer or sub-layers may be formed by any known method in the art, including discrete deposition or continuous deposition processes. In one or more embodiments, the layer may be formed using only continuous deposition processes, or, alternatively, only discrete deposition processes.

In embodiments, the substrate 450 is a glass substrate that is optionally chemically strengthened and comprises a thickness of from 0.05 to 2.0 mm. In one or more embodiments, the substrate 450 may be a transparent plastic, such as PMMA, polycarbonate and the like, or may be a glass material (which may be optionally strengthened).

The various glass substrate(s) of the glass articles discussed herein, such as the substrate 450, may be formed from any suitable glass composition comprising soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may comprise $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition comprises $Al_2O_3$ in an amount greater than about 4 mol %, or greater than about 5 mol %. In one or more embodiments, the glass composition comprises $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from 9 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, glass layer(s) herein are described as an aluminosilicate glass article or comprising an aluminosilicate glass composition. In such embodiments, the glass composition or article formed therefrom comprises $SiO_2$ and $Al_2O_3$ and is not a soda lime silicate glass. In this regard, the glass composition or article formed therefrom comprises $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and comprising 2 mol %, 1.5 mol %, 1 mol %, or 0.5 mol %. In one or more embodiments, the glass composition is substantially free of $P_2O_5$.

In one or more embodiments, the glass composition may comprise a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition comprises a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may comprise the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition comprises $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition comprises less than about 4 mol % $K_2O$, less than about 3 mol % $K_2O$, or less than about 1 mol % $K_2O$. In some instances, the glass composition may comprise $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may comprise a total amount of RO (which is the total amount of alkaline earth metal oxide such as CaO, MgO, BaO, ZnO and SrO) in a range from about 0 mol % to about 2 mol %. In some embodiments, the glass composition comprises a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition comprises CaO in an amount less than about 1 mol %, less than about 0.8 mol %, or less than about 0.5 mol %. In one or more embodiments, the glass composition is substantially free of CaO. In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises SnO2 in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may comprise an oxide that imparts a color or tint to the glass articles. In some embodiments, the glass composition comprises an oxide that prevents discoloration of the glass article when the glass article is exposed to ultraviolet radiation.

Examples of such oxides comprise, without limitation oxides of: Ti, V, Cr, Mn, Fe, Co, Ni, Cu, Ce, W, and Mo.

In one or more embodiments, the glass composition comprises Fe expressed as $Fe_2O_3$, wherein Fe is present in an amount up to (and comprising) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition comprises $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition comprises $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be comprised in the amounts otherwise disclosed herein.

In one or more embodiments, the glass substrate herein may be formed from a strengthened glass sheet or article. In one or more embodiments, the glass substrates used to form the glass articles discussed herein may be strengthened to comprise compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments, the glass substrates used to form the glass articles discussed herein may be strengthened mechanically by utilizing a mismatch of the coefficient of thermal expansion between portions of the glass to create a compressive stress region and a central region exhibiting a tensile stress. In some embodiments, the glass substrate may be strengthened thermally by heating the glass to a temperature above the glass transition point and then rapidly quenching.

In one or more embodiments, the glass substrates used to form the glass articles discussed herein may be chemically strengthening by ion exchange. In the ion exchange process, ions at or near the surface of the glass substrate are replaced by—or exchanged with—larger ions having the same valence or oxidation state. In those embodiments in which the glass substrate comprises an alkali aluminosilicate glass, ions in the surface layer of the article and the larger ions are monovalent alkali metal cations, such as Li+, Na+, K+, Rb+, and Cs+. Alternatively, monovalent cations in the surface layer may be replaced with monovalent cations other than alkali metal cations, such as Ag+ or the like. In such embodiments, the monovalent ions (or cations) exchanged into the glass substrate generate a stress.

Ion exchange processes are typically carried out by immersing a glass substrate in a molten salt bath (or two or more molten salt baths) containing the larger ions to be exchanged with the smaller ions in the glass substrate. It should be noted that aqueous salt baths may also be utilized. In addition, the composition of the bath(s) may comprise more than one type of larger ion (e.g., Na+ and K+) or a single larger ion. It will be appreciated by those skilled in the art that parameters for the ion exchange process, comprising, but not limited to, bath composition and temperature, immersion time, the number of immersions of the glass substrate in a salt bath (or baths), use of multiple salt baths, additional steps such as annealing, washing, and the like, are generally determined by the composition of the glass substrate (comprising the structure of the article and any crystalline phases present) and the desired DOC and CS of the glass layer(s) of a glass substrate that results from strengthening.

Exemplary molten bath composition may comprise nitrates, sulfates, and chlorides of the larger alkali metal ion. Typical nitrates comprise $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on the glass thickness, bath temperature and glass (or monovalent ion) diffusivity. However, temperatures and immersion times different from those described above may also be used.

In one or more embodiments, the glass substrates used to form the glass articles may be immersed in a molten salt bath of 100% $NaNO_3$, 100% $KNO_3$, or a combination of $NaNO_3$ and $KNO_3$ having a temperature from about 370° C. to about 480° C. In some embodiments, the glass substrates may be immersed in a molten mixed salt bath comprising from about 5% to about 90% $KNO_3$ and from about 10% to about 95% $NaNO_3$. In one or more embodiments, the glass substrate may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass substrates may be immersed in a molten, mixed salt bath comprising $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass layer(s) of a glass substrate. The spike may result in a greater surface CS value. This spike can be achieved by single bath or multiple baths, with the bath(s) having a single composition or mixed composition, due to the unique properties of the glass compositions used in the glass layer(s) of a decorated glass structure described herein.

In one or more embodiments, where more than one monovalent ion is exchanged into the glass substrate, the different monovalent ions may exchange to different depths within the glass substrate (and generate different magnitudes stresses within the glass substrate at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass substrate. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from GlasStress Ltd., located in Tallinn Estonia), depending on the strengthening method and conditions. When the glass substrate is chemically strengthened by an ion exchange treatment, FSM or SCALP may be used depending on which ion is exchanged into the glass substrate. Where the stress in the glass substrate is generated by exchanging potassium ions into the glass substrate, FSM is used to measure DOC. Where the stress is generated by exchanging sodium ions into the glass substrate, SCALP is used to measure DOC. Where the stress in the glass substrate is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrate s is measured by FSM. Central tension or CT is the maximum tensile stress and is measured by SCALP.

In one or more embodiments, the glass substrate maybe strengthened to exhibit a DOC that is described a fraction of the thickness t of the glass article (as described herein). For example, in one or more embodiments, the DOC may be equal to or greater than about 0.05t, equal to or greater than about 0.1t, equal to or greater than about 0.11t, equal to or greater than about 0.12t, equal to or greater than about 0.13t, equal to or greater than about 0.14t, equal to or greater than about 0.15t, equal to or greater than about 0.16t, equal to or greater than about 0.17t, equal to or greater than about 0.18t, equal to or greater than about 0.19t, equal to or greater than about 0.2t, equal to or greater than about 0.21t. In some embodiments, The DOC may be in a range from about 0.08t to about 0.25t, from about 0.09t to about 0.25t, from about 0.18t to about 0.25t, from about 0.11t to about 0.25t, from about 0.12t to about 0.25t, from about 0.13t to about 0.25t, from about 0.14t to about 0.25t, from about 0.15t to about 0.25t, from about 0.08t to about 0.24t, from about 0.08t to about 0.23t, from about 0.08t to about 0.22t, from about 0.08t to about 0.21t, from about 0.08t to about 0.2t, from about 0.08t to about 0.19t, from about 0.08t to about 0.18t, from about 0.08t to about 0.17t, from about 0.08t to about 0.16t, or from about 0.08t to about 0.15t. In some instances, the DOC may be about 20 µm or less. In one or more embodiments, the DOC may be about 40 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 µm to about 100 µm.

In one or more embodiments, the glass substrates may have a CS (which may be found at the surface or a depth within the glass article) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the glass substrates may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa.

In embodiments, the glass article 400 comprises a functional surface layer 490. The functional surface layer 490 can be configured to provide one or more of a variety of functions. For example, the functional surface layer 490 may be optical coating configured to provide easy-to-clean performance, anti-glare properties, antireflection properties, and/or half-mirror coating. Such optical coatings can be created using single layers or multiple layers. In the case of anti-reflection functional surface layers, such layers may be formed using multiple layers having alternating high refractive index and low refractive index. Non-limiting examples of low refractive index films include $SiO_2$, $MgF_2$, and $Al_2O_3$, and non-limiting examples of high refractive index films include $Nb_2O_5$, $TiO_2$, $ZrO_2$, $HfO_2$, and $Y_2O_3$. In embodiments, the total thickness of such an optical coating (which may be disposed over an anti-glare surface or a smooth substrate surface) is from 5 nm to 750 nm. Additionally, in embodiments, the functional surface layer 490 that provides easy-to-clean performance also provides enhanced feel for touch screens and/or coating/treatments to reduce fingerprints. In some embodiments, functional surface layer 490 is integral to the first surface of the substrate. For example, such functional surface layers can include an etched surface in the first surface of the substrate 450 providing an anti-glare surface (or haze of from, e.g., 2% to 20%).

The opaque layer 500 is printed onto the light management layer 460, when included. Certain existing UV-curable inks have been shown to be incompatible (e.g., lack the requisite adhesion) with the light management layer 460. For example, existing photocurable inks, when used for the opaque layer, may chemically react with the ink of the light management layer 460 (either upon deposition or after environmental testing) to change the characteristics (e.g., color, size) of the ink layers. Existing photocurable inks may also diffuse into the light management layer 460 and degrade performance thereof. The photocurable ink compositions described herein, when used to form the opaque layer 500 and printed on the light management layer 460, do not suffer from such deficiencies and still provide adequate adhesion to the substrate 450 even when the light management layer 460 is present.

The light management layer 460, when included, may be printed on the substrate 450. In embodiments, the light management layer 460 is formed from a suitable thermal or UV cured ink. The light management layer 460 may generally reduce the optical transmission of the glass article 400 such that the glass article 400 exhibits a similar appearance to users irrespective of whether the display 540 is powered on or off. For example, the light management layer 460 may obscure edges of the display region 520, rendering the boundaries of the display region 520 inconspicuous to viewers when the display is powered off. The light management layer 460 may generally be constructed as described in any of International Patent Application Publication Nos. WO 2019/055458 A1, entitled "Black Deadfront for Display Device and Methods," WO 2020/205519 A1, entitled "Decorated Glass Having a Printed Ink Layer," or WO 2021/118835 A1, entitled, "Display Devices and Articles with Color-Matched Display and Non-Display Areas," each of which are hereby incorporated by reference in their entirety.

Opaque Layer

Referring still to FIG. 2, in embodiments, the opaque layer 500 may be constructed of at least one of the photocurable ink compositions and the ink primers described herein. For example, in some embodiments, the opaque layer 500 may be comprise a photocurable ink comprising at least 11 wt % of a pigment. In other embodiments, the opaque layer may comprise an ink composition comprising at least 11 wt % of a pigment and an adhesion promoter. In such embodiments, the adhesion promoter is bonded to the glass substrate and the ink composition is polymerized with the adhesion promoter. Accordingly, the opaque layer 500 may comprise a relatively high optical density (e.g., greater than or equal to 5) in order to block light transmittance. In embodiments, the opaque layer 500 is used to block light from transmitting trough certain regions of the glass article 400. In embodiments, the opaque layer 500 obscures functional or non-decorative elements provided for the operation of the glass article 400. In embodiments, the opaque layer 500 is provided to outline backlit icons and/or other graphics (not depicted) so as to increase the contrast at the edges of such icons and/or graphics.

In embodiments, as shown in FIG. 2, the glass article 400 is placed over or in front of a display 540. In one or more embodiments, the display 540 may include a touch-enabled displays which include a display and touch panel. Exemplary displays include LED display, a DLP MEMS chip, LCDs, OLEDs, transmissive displays, and the like. The glass article 400 may generally have an average transmittance from 380 nm to 750 nm that is greater than or equal to 10% (e.g., greater than or equal to 20%, greater than or equal to 30%, greater than or equal to 40%, greater than or equal to 50%, greater than or equal to 60%, greater than or equal to 70%). The high optical density of the opaque layer 500, however, causes the areas of the glass article 400 incorporating the opaque layer 500 to have relatively low optical transmission (e.g., an average transmittance of less than or equal to 0.1% in the visible spectrum). Accordingly, the boundaries of the opaque layer 500 may define a display region 520 where the glass article 400 exhibits a relatively high optical transmission to facilitate visibility of images generated by the display 540.

In the depicted embodiment, the opaque layer 500 covers the edges 550 of the display 540 to hide the edges 550 from view through the first surface 470. The opaque layer 500 may also be used to obscure various other components from view (e.g., electrical connections, mechanical housings, and the like). The opaque layer 500 generally facilitates a desired portion of the display 540 being viewable by users viewing the first surface 470.

In embodiments, the opaque layer 500 is applied via inkjet printing over the light management layer 460 and/or over the second surface 480 of the substrate 450. In embodiments, the opaque layer 500 may be directly deposited onto the second surface 480 of the substrate 450 using a suitable inkjet process. In embodiments, prior to deposition of the opaque layer 500, in embodiments not utilizing the ink primers described herein, the second surface 480 may be primed using a suitable primer (e.g., an acryloxy silane primer) to facilitate adhesion of the opaque layer 500 to the substrate 450. Any suitable treatment to the second surface 480 may be used to facilitate adhesion of the opaque layer 500 to the substrate 450.

As described herein, the opaque layer 500 has a relatively high adhesion to glass. In embodiments, the opaque layer 500 exhibits an adhesion to the glass substrate greater than or equal to 4B, after being subjected to a temperature of 85° C. at 95% relative humidity for a period of at least 500 hours, when tested according to ASTM 3359. In embodiments, the opaque layer 500 exhibits an adhesion to the glass substrate greater than or equal to 4B, after 500 1 hour cycles of being held at a temperature of −40° C. for 0.5 hours and a temperature of 95° C. for 0.5 hours, when tested according to ASTM 3359.

The opaque layer 500 may have a desired thickness of less than or equal to 15 μm. In embodiments, the opaque layer 500 may have a thickness less than or equal to 15 μm or even less than or equal to 10 μm. In embodiments, the opaque layer 500 may have a thickness greater than or equal to 1 μm or even greater than or equal to 5 μm. In embodiments, the opaque layer 500 may have a thickness greater than or equal to 1 μm and less than or equal to 15 μm, greater than or equal to 1 μm and less than or equal to 10 μm, greater than or equal to 5 μm and less than or equal to 15 μm, or even greater than or equal to 5 μm and less than or equal to 10 μm, or any and all sub-ranges formed from any of these endpoints.

In embodiments, the photocurable ink compositions and/or ink primers described herein may be tailored to meet particular appearance requirements associated with design needs. The opaque layer 500 can be any color; in particular embodiments, though, the opaque layer 500 is black or gray. For example, a cover glass comprising an opaque layer constructed of the photocurable ink compositions and/or ink primers described herein may meet any of the black mask color targets in Table 2.

TABLE 2

| | CM700D (CIE D65, 10°) Measurement through bare glass | | | | | |
|---|---|---|---|---|---|---|
| | SCI | | | SCE | | |
| Ink Type | L* | a* | b* | L* | a* | b* |
| Black Mask | 25.0 | 0.05 | −0.2 | <1 | 0 | 0 |
| Black Mask | 25.3 | | | | | |
| Black Mask | 25.7 | | | | | |
| Black Mask | 25.9 | | | | | |
| Black Mask | 26.0 | | | | | |
| Black Mask | 26.8 | | | | | |

TABLE 2-continued

| | CM700D (CIE D65, 10°) Measurement through bare glass | | | | | |
|---|---|---|---|---|---|---|
| | SCI | | | SCE | | |
| Ink Type | L* | a* | b* | L* | a* | b* |
| Black Mask | 27.4 | | | | | |
| Black Mask | 27.7 | | | | | |
| Black Mask | 28.3 | | | | | |
| Black Mask | 28.5 | | | | | |
| Black Mask | 30.1 | | | | | |

In embodiments, opaque layers constructed using the photocurable ink compositions and/or ink primers described herein may meet any of the combinations of values contained in the Table 2 within the tolerances outlined in the Table 3 below.

TABLE 3

| OD | ΔE within the part | L* Tol | a* Tol | b* Tol |
|---|---|---|---|---|
| ≥4 | 0.6 | ±0.10 | ±0.10 | ±0.10 |

As demonstrated by Tables 2 and 3, glass articles incorporating the photocurable ink compositions and/or ink primers described herein, when viewed from an uncoated surface of the cover glass (e.g., from a side of the glass opposite to that on which a display disposed) may generally have CIELAB L* values that are less than or equal to 30 (less than or equal to 29, less than or equal to 28, less than or equal to 27, less than or equal to 25, less than or equal to 25), CIELAB a* values (specular component included) that are greater than or equal to −0.05 and less than or equal to 0.15, and CIELAB b* values (specular component included) that are less than or equal to −0.1 and greater than or equal to −0.3, when illuminated with a CIE D65 illuminant at a 10° angle of incidence. When the specular component is excluded, the glass article may exhibit CIE L* values that are less than or equal to 1, and CIELAB a* and b* values with magnitudes that are less than or equal to 0.1. Areas of the cover glass coated with the photocurable ink compositions and/or ink primers described herein may exhibit dark, neutral appearances to facilitate concealing various components from view.

The photocurable ink compositions and/or ink primers of the present disclosure may also be used to construct opaque layers on a glass article that exhibit favorable reliability testing results when compared to certain existing photocurable inks and/or ink primers. Automotive interior components are subjected to environmental conditions that are highly variable (e.g., in terms of temperature and relative humidity). In embodiments, opaque layers may meet one or more of the following criteria when subjected to the reliability testing outlined in Table 4.

TABLE 4

| Test | Test Method/Conditions/Tool | Acceptance Criteria | Sample Size |
|---|---|---|---|
| A - Damp Heat, Cyclic (with Frost) | 1. Test Condition<br>① Preconditioning: 55° C. ± 2° C. with a relative humidity not exceeding 20% for a period of 24 h prior to the first cycle of the damp heat test.<br>② Cycles 1-5: include cold phase<br>a) 0-1.5 hr: raise to 25° C. ± 2° C., 93 ± 3%<br>b) 1.5-2.5 hr: raise to 65° C. ± 2° C., 93 ± 3%<br>c) 2.5-5.5 hr: keep at 65° C. ± 2° C., 93 ± 3%<br>d) 5.5~7/8 hr: decrease to 25° C. ± 2° C., 80~96%<br>e) 8~9.5/10.5 hr: raise to 65° C. ± 2° C., 93 ± 3%<br>f) ~9.5/10.5-13.5 hr: keep at 65° C. ± 2° C., 93 ± 3%<br>g) 13.5~15/16 hr: decrease to 25° C. ± 2° C., 80~96%<br>h) ~15/16-17.5 hr: keep at 25° C. ± 2° C., 93 ± 3%<br>i) 17.5~18 hr: decrease to −10° C. ± 2° C., uncontrolled %<br>j) 18-21 hr: keep at −10° C. ± 2° C., uncontrolled %<br>k) 21-22.5 hr: raise to 25° C. ± 2° C., uncontrolled %<br>l) 22.5-24 hr: keep at 25° C. ± 2° C., 93 ± 3%<br>③ Cycles 6-10: without a cold phase<br>a) ② a)-g)<br>b) 15/16-24 hr: keep at 25° C. ± 2° C., 93 ± 3%<br>2) Total cycles: 10 (5 + 5) | 1. Delta E (before/after test) <2<br>2. Ink adhesion ≥4B | 2 |
| B.1 - High Temp/High Humidity | 65° C./95% RH, 500 hrs | 1. Delta E (before/after test) <2<br>2. Ink adhesion ≥4B | 2 |
| B.2 - High Temp/High Humidity | 85° C./95% RH, 500 hrs | 3. Delta E (before/after test) <2<br>1. Ink adhesion ≥4B | 2 |
| C - High Temp. | 95° C., 500 hrs | 2. Delta E (before/after test) <2<br>3. Ink adhesion ≥4B | 2 |
| D - Low Temp. | −40° C., 500 hrs | 1. Delta E (before/after test) <2<br>2. Ink adhesion ≥4B | 2 |
| E - Chemical Resistance | Test temp.: TRT (23° C.);<br>Test duration: 2 Hr;<br>Method: Wet a cotton cloth (30*30 mm) with 50 ml respective chemical agent (e.g., ammonia base cleaner, antifreeze, soda, citric acid, electric grease connector, nail polish remover, hand cleaner, hand lotion, battery liquid); Wet the DUT with this cotton cloth until it is completely wet, let redundant agent drip off the DUT | 1. No crack/bleach/color change allowed<br>2. Delta E (before/after test) <2 | 2 |

TABLE 4-continued

| Test | Test Method/Conditions/Tool | Acceptance Criteria | Sample Size |
|---|---|---|---|
| D - Salty Water | Salty Water Chamber: 5% NaCl, 35° C. for 72 hrs -> water cleaning -> drying | 1. Delta E (before/after test) <2<br>2. Ink adhesion ≥4B | 2 |
| F - Cross Hatch Tape Test | ASTM 3359 | 1. Ink deterioration such as flaking, peeling, cracking or blistering: not allowed<br>2. Ink adhesion ≥4B | 2 |
| G - Solar Radiation Test | 1. Test condition<br>1) Z-IN1 profile of DIN 75220<br>① dry air (15 days)<br>chamber temp: +80 ± 3° C.<br>relative humidity: <30<br>Irradiance: 830 ± 80 [W/m2]<br>② humid climate (10 days)<br>chamber temp: +80 ± 3° C.<br>relative humidity: >40<br>Irradiance: 830 ± 80 [W/m2]<br>2) Test duration: 25 days (15 days dry test, 10 days humid climate test) | 1. Delta E (before/after test) <2<br>2. Ink adhesion ≥4B<br>3. No cracking allowed | 2 |
| H - Thermal Shock Test | Thermal Shock Test Machine −40° C. (0.5 hr) ~95° C. (0.5 hr), 500 cycles | 1. Delta E (before/after test) <2<br>2. Ink adhesion ≥4B | 2 |

Certain existing UV-curable inkjet compatible inks crack or otherwise fail when subjected to such testing conditions, rendering these inks unsuitable for certain automotive interior applications. For example, certain existing inks have been found to shrink and/or crack when subjected to Test B contained in the Table 4 above, while opaque layers formed from the photocurable ink compositions and/or ink primers described herein meet the testing criteria contained in the Table 4.

In embodiments, the glass article exhibits a maximum ΔE value (both SCI and SCE), measured both prior to and after 500 1 hour cycles of being held at a temperature of −40° C. for 0.5 hours and a temperature of 95° C. for 0.5 hours, less than 2.0

In addition to meeting the aforementioned reliability testing requirements, the photocurable ink compositions and/or ink primers described herein may meet additional requirements to render them suitable for use with certain commercially available inkjet printers. For example, the pigment may comprise an average particle size less than or equal to 200 nm, less than or equal to 150 nm, less than or equal to 100 nm, or even less than or equal to 50 nm to achieve a desirable L*. In embodiments, the photocurable ink and/or in the ink primer may comprise a liquid surface tension greater than or equal to 25 dynes/cm and less than or equal to 35 dynes/cm. In embodiments, the opaque layer may exhibit a cured surface tension greater than 36 dynes/cm. In embodiments, the opaque layer may exhibit an electrical resistivity greater than or equal to $1 \times 10^9$ Ω/sq, when measured according to ASTM D-257 at 100V DC.

The opaque layers described herein may also exhibit a pencil hardness of greater than or equal to 3H when measured according to ASTM 3363, entitled "Standard Test Method for Film Hardness by Pencil Test," hereby incorporated by reference in its entirety, with a 750 g weight and the pencil at a 45° angle, after curing with a narrowband UV LED light source emitting narrowband (e.g., less than or equal to 20 nm bandwidth, less than or equal to 30 nm bandwidth) curing light. Use of such UV LEDs saves space, cost, and is less environmentally harmful when compared with certain existing UV curing lamps. Certain existing UV-curing inks may not sufficiently cure to have such a pencil hardness due when meeting the optical density requirements described herein due to opacity of the ink inhibiting curing. The photoinitiators of the inks and/or ink primers described herein may be selected to facilitate curing using UV LEDs, while still meeting the pencil hardness and optical density requirements described herein.

As such, the photocurable inks and/or ink primers described herein are able to provide relatively high optical density to facilitate efficacy as a black matrix layer in a display, while being compatible with high throughput inkjet printing process and also meeting stringent reliability testing requirements associated with automotive interior displays. The photocurable inks and/or ink primers described herein save fabrication costs for display glass articles while still providing highly reliable opaque layers demonstrated to provide consistent color performance over the lifetime of the component.

Methods of Fabricating Glass Article Ink Compositions

Figure 3:
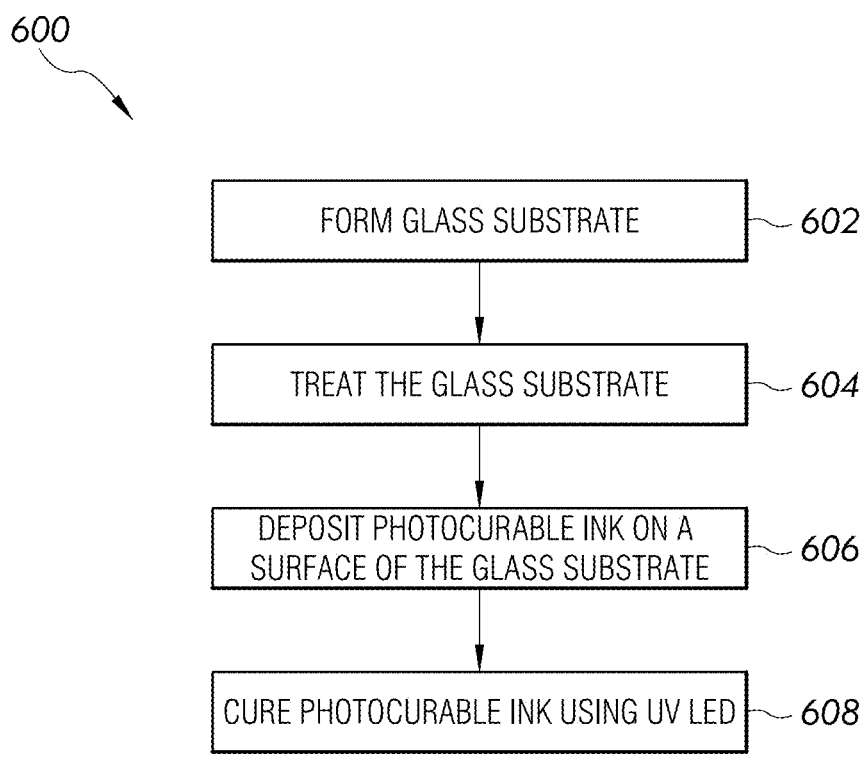
FIG. 3 depicts a flow diagram of a method of forming a glass article with an opaque layer, according to one or more embodiments of the present disclosure.

Referring now to FIG. 3, a method of fabricating a glass article is shown at 300. The method 600 may be performed to fabricate the glass article 400 described herein with respect to FIG. 2. Accordingly, reference will be made to various components described with respect to FIG. 2 to aid in the description of the method. It should be understood that other glass articles may be formed via performance of the method 600 and that the method 600 is not limited to a particular number or order of process steps.

At block 602, the substrate 450 is fabricated. Any suitable glass production process, such as a fusion down draw process, a float process, or the like may be used. Additional details regarding glass forming methods are provided herein. At block 604, the substrate 450 is treated. For example, in embodiments, the substrate 450 is subjected to a strengthening treatment (e.g., ion exchange strengthening, thermal strengthening). Additional details regarding strengthening treatments that may be provided to the substrate 450 are provided herein.

In embodiments, the treatments applied to the substrate 450 during the block 604 may be used to form the functional surface layer 490. For example, in embodiments, substrate 450 is chemically etched such that at least the first surface 470 exhibits anti-glare properties. A suitable anti-reflective coating and/or ETC coating may also be deposited onto the first surface 470 via a suitable deposition process. In embodiments, the second surface 480 may be primed (e.g., using a suitable chemical primer or ink) to facilitate adhesion of the opaque layer 500 thereto. In embodiments, the light management layer 460 may be deposited and cured onto the second surface 480 (e.g., a suitable ink may be cured thermally or via exposure to electromagnetic radiation).

At block 606, a photocurable ink is deposited onto the second surface 480 to initiate forming the opaque layer 500. As described herein, a suitable inkjet printing device may be used to deposit droplets of a suitable size onto the second surface 480 such that the photocurable ink forms a suitable pattern. Various parameters used to operate the inkjet printing device (e.g., control waveform, translation rate, deposition temperature) may vary depending on the composition of the photocurable ink and desired deposition pattern. As noted with respect to block 604, the second surface 480 may have an ink primer, such as those described herein, applied thereto prior to deposition of the photocurable ink.

At block 608, the photocurable ink is cured on the second surface 480 via exposure to electromagnetic radiation generated by a UV LED. In embodiments, the UV LED emits radiation having a relatively narrow bandwidth (e.g., less than or equal to 50 nm, less than or equal to 40 nm, less than or equal to 30 nm, less than or equal to 20 nm) surrounding a center UV wavelength (e.g., 375 nm, 380 nm, 385 nm, 390 nm, 395 nm, 400 nm). Operational parameters of the UV LED (e.g., output intensity, exposure period) may vary depending on various aspects of the opaque layer 500 (e.g., thickness, composition).

In embodiments, the blocks 606 and 608 may be performed while the substrate 450 comprises a planar shape. In embodiments, the blocks 606 and 608 are performed while the substrate is in a curved shape. For example, after application of at least some of the treatments described with respect to the block 604, the substrate 450 may be cold-formed via the methods described herein, and the opaque layer 500 may be formed on a cold-formed glass substrate. In embodiments, a suitable display panel is laminated to the glass article such that the opaque layer 500 at least partially covers the display panel.

Given the relatively high pigment concentration in each of the ink compositions, it has been found that a multi-print and cure architecture may be used to cure the photocurable inks to provide favorable adhesion performance while meeting the optical density requirement described herein. Such an architecture involves a process where the opaque layer 500 (see FIG. 2) is incrementally deposited on the substrate in sub-layers that are only a portion (e.g., less than or equal to 40%, less than or equal to 33%, less than or equal to 30%, less than or equal to 25%, greater than or equal to 10%) of a desired final thickness of the opaque layer 500. After each sub-layer is deposited, a relatively low dose ("pinning dose") of UV light is provided to at least partially cure (or "pin") the sublayer. After a sufficient number of sub-layers (e.g., 3, 4, 5, 6, 7, or even greater) are deposited, the entire stack (substrate 450 and superimposed sub-layers) can put through a final curing step (if needed) with a higher dose of UV radiation than in the pinning steps.

Figure 4:
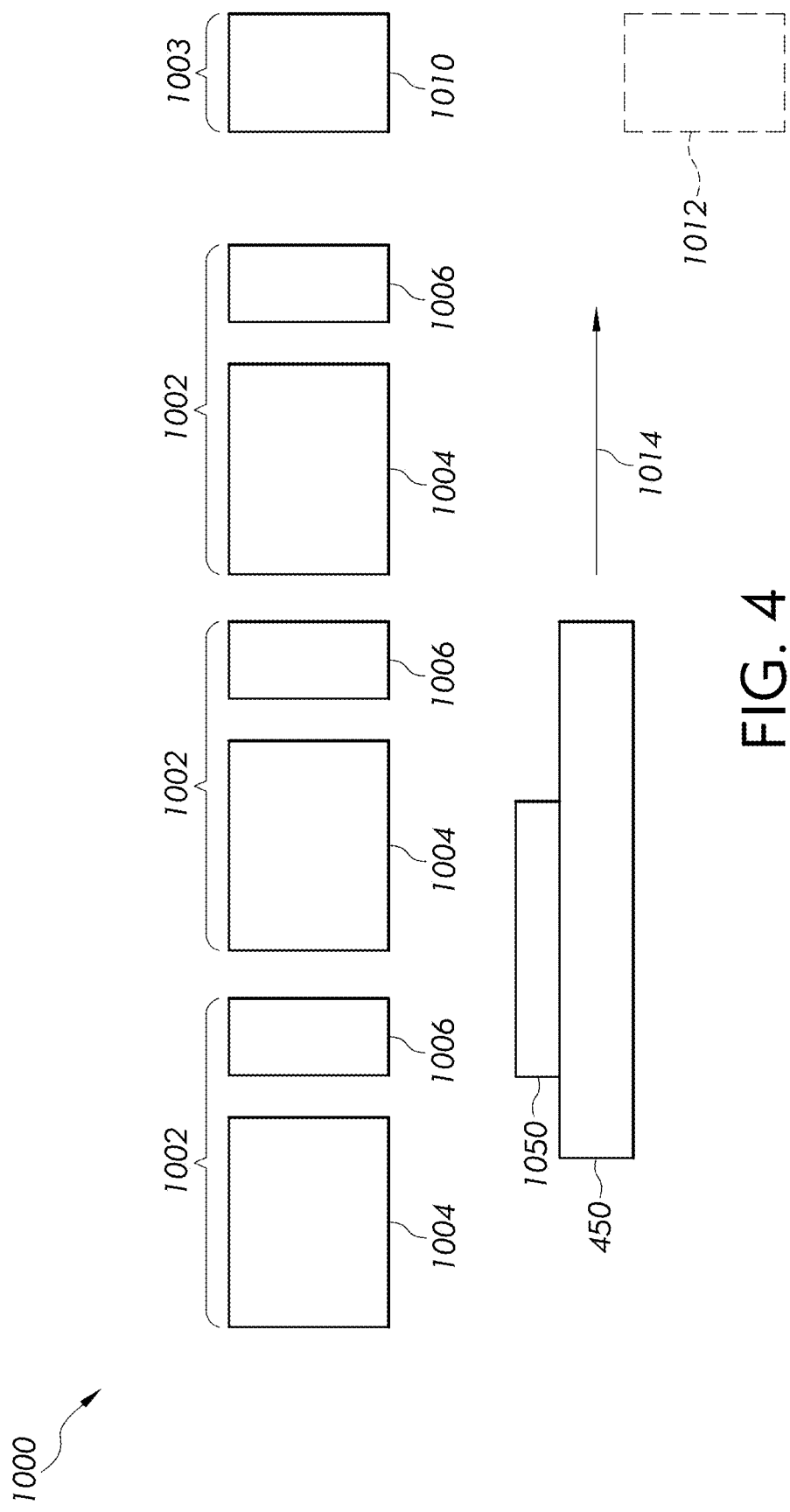
FIG. 4 schematically depicts an apparatus for depositing an opaque layer onto a glass substrate, according to one or more embodiments of the present disclosure.

An example ink deposition apparatus 1000 for implementing the multi-print and cure architecture described herein is shown in FIG. 4. The apparatus 1000 is shown to include a plurality of deposition and pinning stages 1002 and an optional final curing stage 1003. The number of deposition and pinning stages 1002 may vary depending on the optical density of the ink used (e.g., pigment concentration) and composition of the photocurable inks (formulations including more reactive monomer, for example, may require less deposition and pinning stages than those including less reactive monomer). Each of the deposition and pinning stages 1002 includes a printhead 1004 and a UV light source 1006 (e.g., a UV lamp or LED). In the depicted example, the glass substrate 450 is translated relative to the stages 1002 and 1003 in a translation direction 1014 (e.g., via rollers contacting the major surface of the substrate 450 opposite to that which the ink is disposed). The printhead 1004 may be a commercially available printhead configured to deposit a sub-layer 1050 (component of the opaque layer 500) on the glass substrate 450 in a pattern that corresponds to a desired pattern for the opaque layer 500 after deposition is complete. In embodiments, to deposit each sub-layer 1050, the printhead 1004 deposits a plurality of droplets of one of the ink compositions described herein to form a sub-layer having a thickness between 2 µm and 10 µm (e.g., greater than or equal to 2 µm and less than or equal to 8 µm, greater than or equal to 2 µm and less than or equal to 6 µm, greater than or equal to 2 µm and less than or equal to 4 µm). After the sub-layer 1050 is deposited within a particular deposition and pinning stage by the printhead 1004, the UV light source 1006 of that stage applies a pinning UV dose to the deposited sub-layer 1050. Staging of the deposition of the ink beneficially provides enough UV cure dosage at a lower layer thickness to achieve good UV penetration on account of the inks having very high optical density.

Whether the final curing stage 1003 is needed depends on the properties of the deposited ink in the sub-layers (the reactivity of the monomers present). In embodiments, when present, the final curing stage 1003 comprises a first UV light source 1010 configured to emit UV light directly onto the sub-layers (after all of them are deposited) at a dosage that is higher (e.g., at least two times higher, at least four times higher, at least 6 times higher, at least 8 times higher, at least 10 times higher, or even at least 15 times higher) than that emitted by the UV light sources 1006 in each of the deposition and pinning stages 1002. Moreover, when present, the final curing stage 1003 can also include a second UV source 1012 configured to emit UV light onto the side of the substrate 450 that is opposite to that on which the sub-layers are disposed. The second UV light source 1012 can provide additional UV dosage to facilitate complete curing of the deposited ink. In embodiments, the second UV light source 1012 can provide the same dosage as the first UV light source 1010. In embodiments, the speed at which the substrate 450 moves relative to the stages 1002 and 1003, as well as the UV dosages of the UV lights sources 1006, 1010 (if present), and 1012 (if present) can be configured according to the Table 5 below. The particular speed and UV dosages selected may depend on the composition of the photocurable inks deposited on the glass.

TABLE 5

| | Min | Max |
|---|---|---|
| Glass translation speed (m/min) | 1 | 5 |
| Pin dosage (J/cm$^2$) | 0.2 | 10 |
| Cure dosage (J/cm$^2$) | 10 | 100 |

Ink Primers

Figure 5:
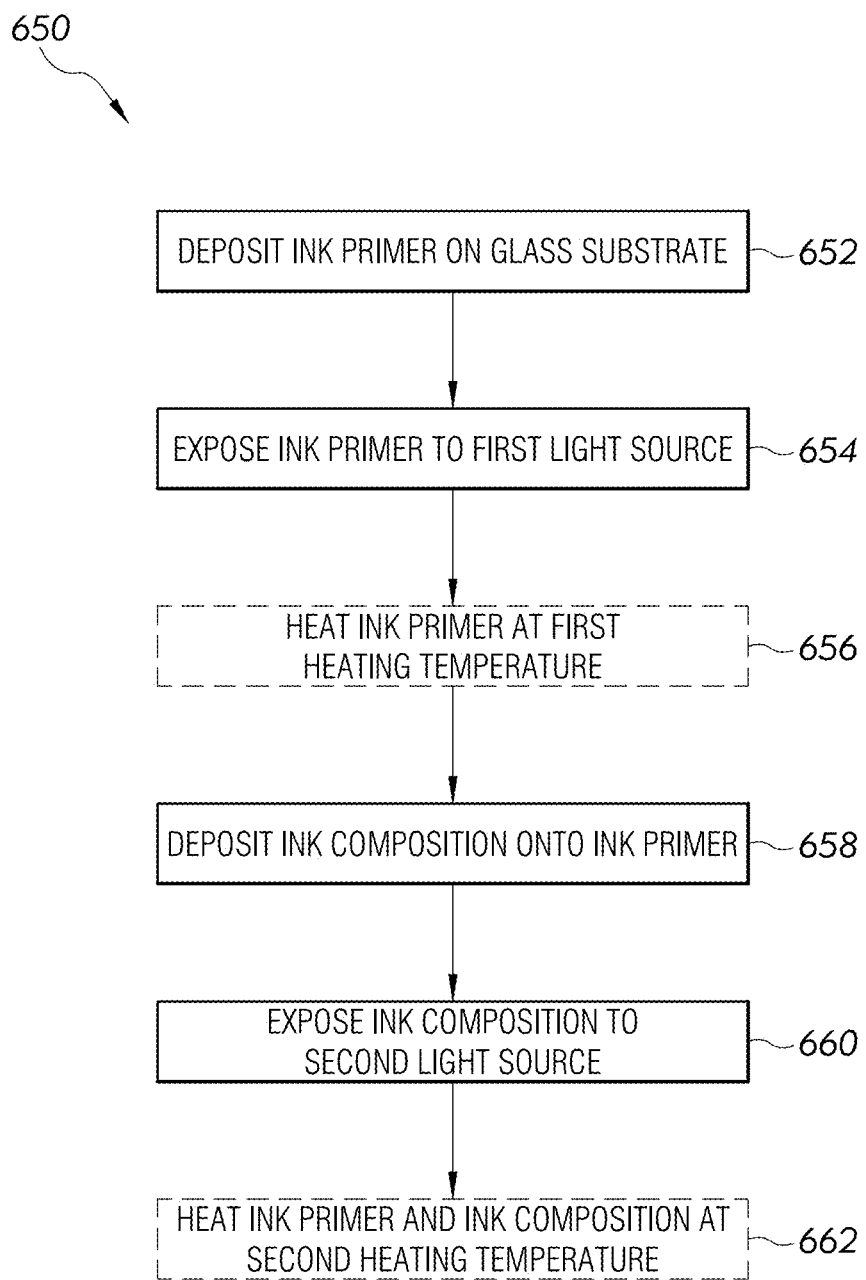
FIG. 5 depicts a flow diagram of another method of forming a glass article with an opaque layer, according to one or more embodiments of the present disclosure.

Referring now to FIG. 5, a method of fabricating a glass article is shown at 650. The method 650 may be performed to fabricate the glass article 400 described herein with respect to FIG. 2. Accordingly, reference will be made to various components described with respect to FIG. 2 to aid in the description of the method. It should be understood that other glass articles may be formed via performance of the method 600 and that the method 600 is not limited to a particular number or order of process steps.

The method 650 begins at block 652 with depositing an ink primer onto a first major surface 470 of a glass substrate 450 at a first deposition temperature less than or equal to 65° C. using a first inkjet printhead. The ink primer may be the ink primer described according to the embodiments herein. Accordingly, in embodiments, during deposition (i.e., at the first deposition temperature), the ink primer may have a viscosity less than 13 cPs. The ink primer may comprise an adhesion promoter configured to bond to glass.

In embodiments, a wet thickness of the ink primer deposited on the glass substrate 450 may be greater than or equal to 8.4 ml/m$^2$ and less than or equal to >11 ml/m$^2$. While not wishing to be bound by theory, a wet thickness lower than 8.4 ml/m$^2$ results in an insufficient amount of reactive connector molecule and a higher wet thickness (>11 ml/m$^2$) results in ungrafted silanes that may negatively effect adhesion.

Referring back to FIG. 5, the method 650 continues at block 654 with exposing the ink primer to a first light source to at least partially cure the ink primer. Depending on the ink primer (e.g., infrared curable ink primer or ultraviolet curable ink primer), the first light source may be an infrared light source or an ultraviolet light source. When exposed to the first light source, the infrared curable ink primer may bond a silane group of the adhesion promoter to the glass and/or may remove solvent. When exposed to the first light source, the ultraviolet curable ink primer may polymerize to form a polymer that will copolymerize with monomers from the ink composition.

Referring back to FIG. 5, the method 650 may optionally continue at block 656 with heating the ink primer at a first heating temperature. Heating the ink primer to the first heating temperature may bond a silane group of the adhesion promoter to the glass. In embodiments in which the ink primer is an infrared curable ink primer, heating the ink primer at the first heating temperature may also remove solvent.

In embodiments, the first heating temperature is greater than or equal to 25° C. and less than or equal to 150° C., greater than or equal to 25° C. and less than or equal to 100° C., greater than or equal to 50° C. and less than or equal to 150° C., or even greater than or equal to 50° C. and less than or equal to 100° C., or any and all sub-ranges formed from any of these endpoints. The ink primer may be heated at the first heating temperature for a period greater than or equal to 1 second and less than or equal to 1 hour, greater than or equal to 1 second and less than or equal to 30 minutes, greater than or equal to 1 minute and less than or equal to 1 hour, greater than or equal to 1 minute and less than or equal to 30 minutes, greater than or equal to 5 minutes and less than or equal to 1 hour, greater than or equal to 5 minutes and less than or equal to 30 minutes, greater than or equal to 10 minutes and less than or equal to 1 hour, or even greater than or equal to 10 minute and less than or equal to 30 minutes, or any and all sub-ranges formed from any of these endpoints.

Referring back to FIG. 5, the method 650 continues at block 658 with depositing an ink composition onto the ink primer at a second deposition temperature less than or less than or equal to 65° C. using a second inkjet printhead. In embodiments, the ink composition may be the ink composition described according to embodiments herein. In embodiments, during deposition (i.e., at the second deposition temperature), the ink primer may have a viscosity less than 13 cPs.

Referring back to FIG. 5, the method 650 continues at block 660 with exposing the ink composition to a second light source to at least partially cure the ink composition, thereby forming an opaque layer. With an infrared curable ink primer, a methacrylate group from the silane group of the adhesion promoter copolymerizes with an ink composition monomer during exposure to the second light source. With an ultraviolet curable ink primer, a polymer of the ink primer copolymerizes with an ink composition monomer during exposure to the second light source.

Referring back to FIG. 5, the method 650 may optionally continue at block 662 with heating the ink primer and the ink composition at a second heating temperature. For example, in embodiments in which an ultraviolet curable ink primer is used, if the ink primer was not heated at a first heating temperature prior to depositing the ink composition, then the ink primer and the ink composition may be heated at a second heating temperature to bond a silane group of the adhesion promoter to the glass.

In embodiments, the second heating temperature is greater than or equal to 25° C. and less than or equal to 150° C., greater than or equal to 25° C. and less than or equal to 100° C., greater than or equal to 50° C. and less than or equal to 150° C., or even greater than or equal to 50° C. and less than or equal to 100° C., or any and all sub-ranges formed from any of these endpoints. The ink primer and the ink composition may be heated at the second heating temperature for a period greater than or equal to 1 second and less than or equal to 1 hour, greater than or equal to 1 second and less than or equal to 30 minutes, greater than or equal to 1 minute and less than or equal to 1 hour, greater than or equal to 1 minute and less than or equal to 30 minutes, greater than or equal to 5 minutes and less than or equal to 1 hour, greater than or equal to 5 minutes and less than or equal to 30 minutes, greater than or equal to 10 minutes and less than or equal to 1 hour, or even greater than or equal to 10 minute and less than or equal to 30 minutes, or any and all sub-ranges formed from any of these endpoints.

EXAMPLES

In order that various embodiments be more readily understood, reference is made to the following examples, which are intended to illustrate various embodiments of ink compositions and ink primers described herein.

Photocurable Ink Compositions

Examples 1-3

Photocurable inks having different compositions were formulated. Additive carbon black dispersions were used in pigment dispersions of each of the inks. The concentration of the pigment was between 10 wt % and 20 wt % of each of the photocurable inks. In Example 1, a pigment dispersion containing a carbon black pigment from Penn Color, Inc. was used that included propoxylated neopentyl glycol diacrylate (PO-PPGDA) as the monomer. The carbon black pigment consisted of 10 wt % of the photocurable ink. In Example 2, a pigment dispersion containing a carbon black pigment from Penn Color, Inc. was used that included trimethylolpropane triacrylate (TMPTA) as the monomer.

The carbon black pigment consisted of 20 wt % of the photocurable ink. In Example 3, a pigment dispersion containing a carbon black pigment from Sun Chemical® was used that included propoxylated neopentyl glycol diacrylate (PO-PPGDA) as the monomer. The carbon black pigment consisted of 10 wt % of the photocurable ink. The inks were jetted onto a chemically strengthened glass substrate using a research grade printhead at a deposition temperature between 55° C. and 65° C. A Dimatix® inkjet cartridge configured to deposit with a drop volume 10 pL at a resolution of 1270 dpi was used to form an opaque layer on the glass. The ink was then cured using a UV LED emitting radiation centered at 395 mm.

Figure 6:
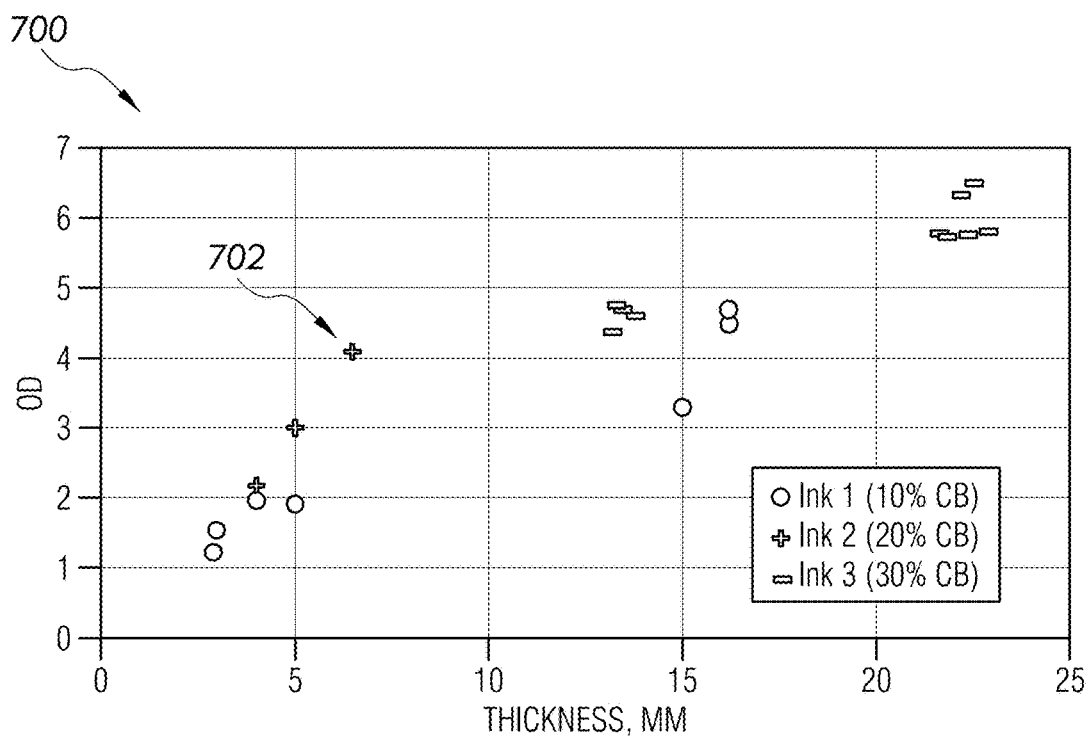
FIG. 6 depicts a plot of measured optical density (y-axis) as a function of opaque layer thickness (x-axis; in mm) for example photocurable inks, according to one or more embodiments of the present disclosure.

Samples generated according to Examples 1-3 were measured for optical density of the resultant opaque layers using a densitometer. FIG. 6 depicts a chart 700 of optical density as a function of opaque layer thickness for the various samples generated. As demonstrated by the point 702, the opaque layers generated from Example 2 (having the highest wt % of the pigment) resulted in an optical density of greater than 4.0 at thicknesses of less than 8 μm, demonstrating the efficacy of the photocurable inks described herein. Each of the samples represented in FIG. 6 were also tested for adhesion and passed the adhesion test (adhesion of greater than or equal to 4B when measured according to ASTM 3359), when the glass was primed with an acryloxy silane primer prior to the printing.

Figure 7:
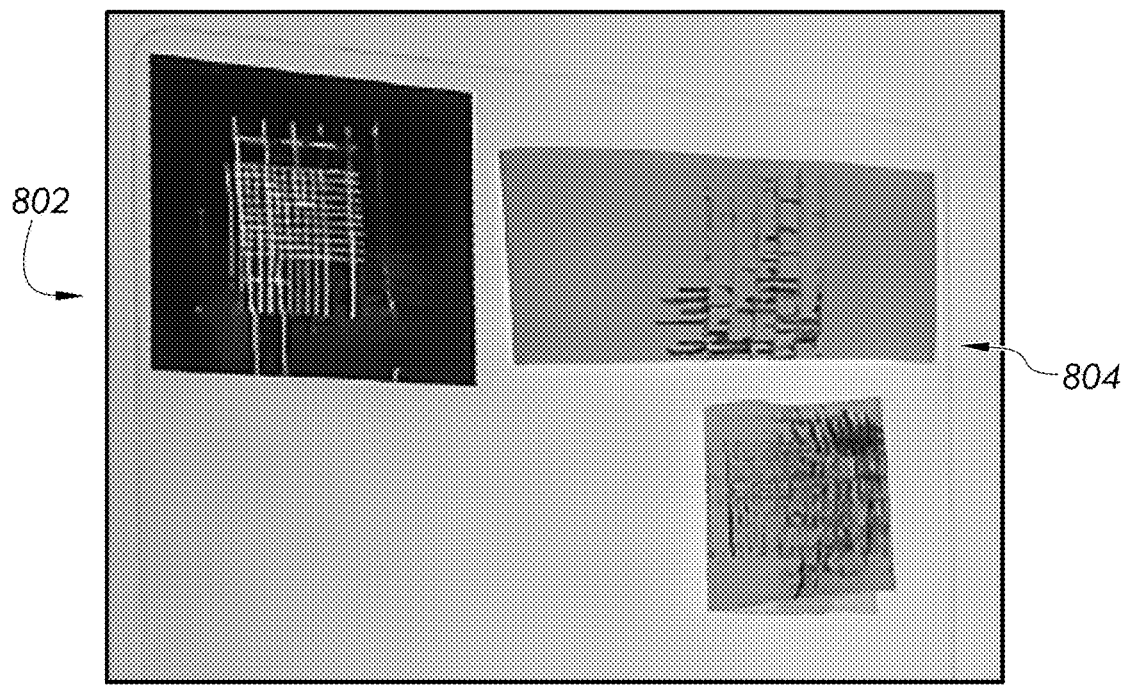
FIG. 7 depicts a photograph of a sample formed from an example photocurable ink after being subjected to a cross-hatch adhesion test, according to one or more embodiments of the present disclosure.

A sample generated using the ink composition of Example 1 was subjected to high temperature, high humidity temperature testing by heating the sample to 85° C. in an environment with 95% relative humidity for a period of 500 hours and subsequently tested for adhesion according to ASTM 3359. The results of the cross-hatch adhesion test are depicted in FIG. 7. As shown, the appearance of opaque layer 802 was largely unaffected by the adhesion test, with only small portions of the opaque layer (depicted on the underside of the tape 804 used in the testing) being removed along the incisions. Such results indicate the reliability and durability of the photocurable inks described herein.

Example 4

Another example was formulated using the composition shown in the Table 6. As shown, the ink formulated according to Example 4 comprised 10 wt % of a carbon black pigment. The ink was jetted onto chemically strengthened glass using a research grade printhead at 60° C. and the printed parts were cured using a UV LED and measured for optical density and thickness. The optical density was measured to be 4.2 at a thickness of 21 μm. The ink passed the adhesion test (with greater than or equal to 4B when measured in accordance with ASTM 3359). It is believed that higher optical density at lower thickness may be achieved using a pigment dispersion with a more dilute monomer.

TABLE 6

| Component | Component Description | Wt % |
|---|---|---|
| UVDJ207 (25% pigment in PONPGDA) | Pigment dispersion | 40 |
| Irgacure 819 (phenylbis(2,4,6-trimethylbenzoyl)phosphine oxide) | Type I photoinitiator | 6 |
| Isopropylthioxanthone | Type II photoinitiator | 3 |
| Omnirad EDB (ethyl 4-(dimethylamino) benzoate) | Amine synergist | 3 |
| n-vinyl caprolactam | Reactive diluent | 5 |
| HPNDA M210 (hydroxyl pivalic acid neopentyl glycol diacrylate) | Difunctional monomer | 22 |
| DPGDA M222 (dipropylene glycol diacrylate) | Difunctional monomer | 20 |
| Ethyl methyl ketone | Solvent | 1 |

Example 5

Another example was formulated using the composition shown in the Table 7. This example differs from the previous example in that the photoinitiator package was modified to maintain cure while reducing the overall percentage in the composition to give more composition flexibility. Sun Chemical D3310-FX-K (25% in IBOA) was observed to have a much lower viscosity than UVDJ207 (25% in PONPGDA) and therefore more attractive for inkjet printing. A mixture design of experiments was also used to optimize the composition for viscosity, printability and overall thickness vs OD. Out of this work, it was found that dipropylene glycol diacrylate (DPGDA M222) performed better than hydroxyl pivalic acid neopentyl glycol diacrylate (HPNDA M210), especially when coupled with dipentaerythritol hexaacrylate (DPHA M600) and vinyl methyl oxazolidinone (Vmox). DPHA M600 added additional crosslinking to the ink and helped with cure. Vmox replaced n-vinyl caprolactam as an even better viscosity modifier, while helping with adhesion. As shown in Table 7, the ink formulated according to Example 5 comprised 11.25 wt % of a carbon black pigment. The ink was jetted onto chemically strengthened glass using a production intent KM1024iSHE printhead at 50° C. and the printed parts were cured using a UV LED and measured for optical density and thickness.

Figure 8:
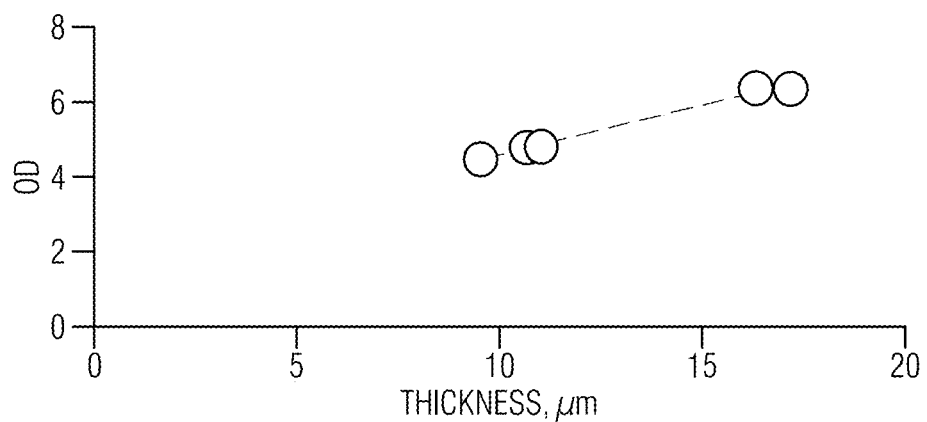
FIG. 8 is a plot showing the optical densities of the samples (y-axis) as a function of opaque layer thickness (x-axis; in μm) formed from an example photocurable ink, according to one or more embodiments of the present disclosure.
Figure 9:
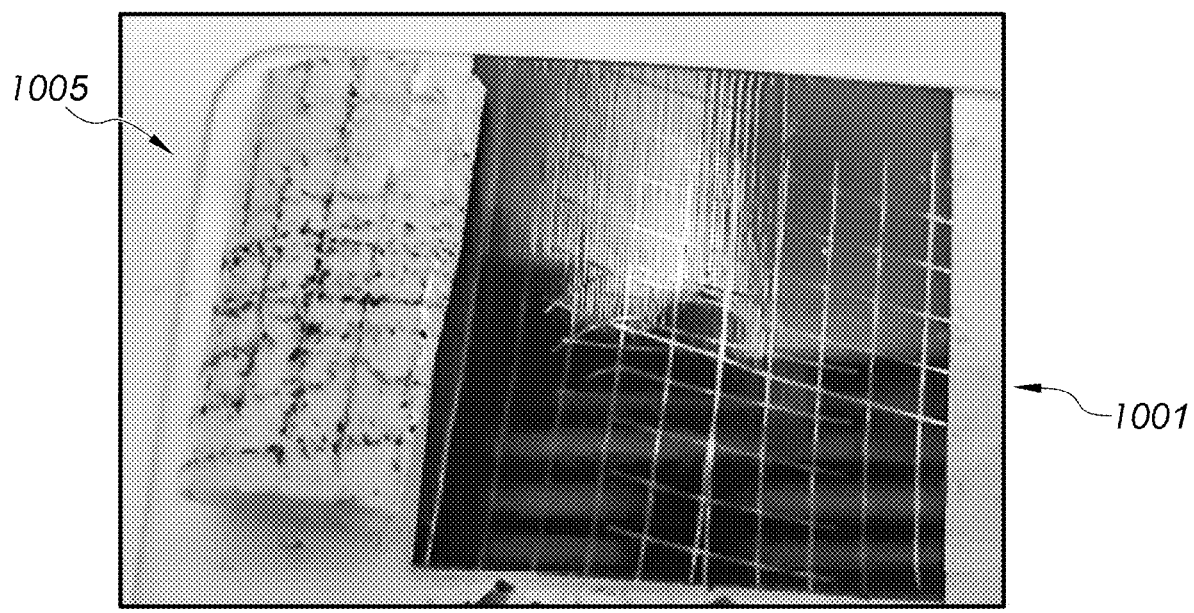
FIG. 9 depicts a photograph of a sample formed from an example photocurable ink after being subjected to a cross-hatch adhesion test, according to one or more embodiments of the present disclosure.

Printed parts were formed using a three-pulse waveform (including a first 10 μs pulse at 1V, a second 10 μs pulse at −1V, and a third 10 μs pulse at 0V) having a total duration of 30 μs. Droplet volume varied from 2.9 pL to 9.0 pL. Droplet velocity varied from 2.67 m/s to 2.86 m/s. Droplet angles varied from 0.21° to 0.60°. FIG. 8 depicts a plot of optical density as a function of thickness for a plurality of samples made in accordance with Example 5. As shown, the composition provided an optical density of greater than 4.0 for thicknesses greater than 10 μm. For example, the optical density was measured to be 4.8 at a thickness of 11 μm. Example 5 was subjected to high temperature, high humidity temperature testing by heating the sample to 85° C. in an environment with 95% relative humidity for a period of 500 hours and subsequently tested for adhesion according to ASTM 3359. As shown in FIG. 9, the ink passed the adhesion test (with greater than or equal to 4B when measured in accordance with ASTM 3359). The appearance of opaque layer 1001 was largely unaffected by the adhesion test, with only small portions of the opaque layer (depicted on the underside of the tape 1005 used in the testing) being removed along the incisions. Such results indicate the reliability and durability of the photocurable inks described herein.

TABLE 7

| Component | Component Description | Wt % |
|---|---|---|
| D3310-FX-K (25% pigment in IBOA) | Pigment dispersion | 45 |
| Irgacure 819 (phenylbis(2,4,6-trimethylbenzoyl)phosphine oxide) | Type I photoinitiator | 4 |
| Isopropylthioxanthone | Type II photoinitiator | 2 |
| Omnirad EDB (ethyl 4-(dimethylamino)benzoate) | Amine synergist | 2 |
| Vinyl methyl oxazolidinone | Reactive diluent | 17 |
| DPHA M600 (dipentaerythritol hexaacrylate) | Multifunctional monomer | 5 |
| DPGDA M222 (dipropylene glycol diacrylate) | Difunctional monomer | 25 |

Counter Examples

Figure 10:
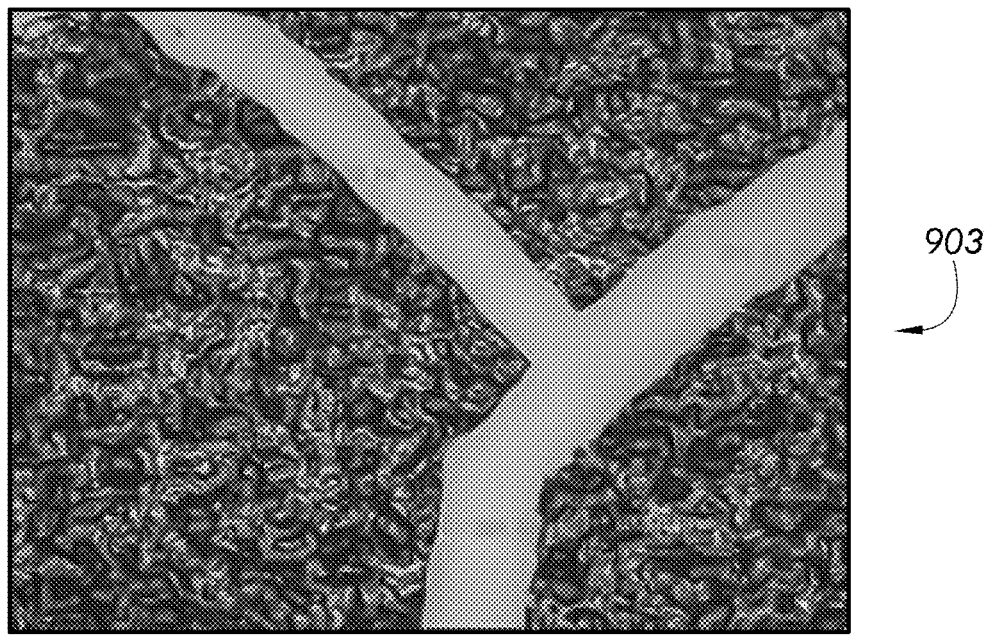
FIG. 10 depicts a photograph of a sample coated with a first commercially available UV-curable ink after being subjected to testing at high temperature and humidity.
Figure 11:
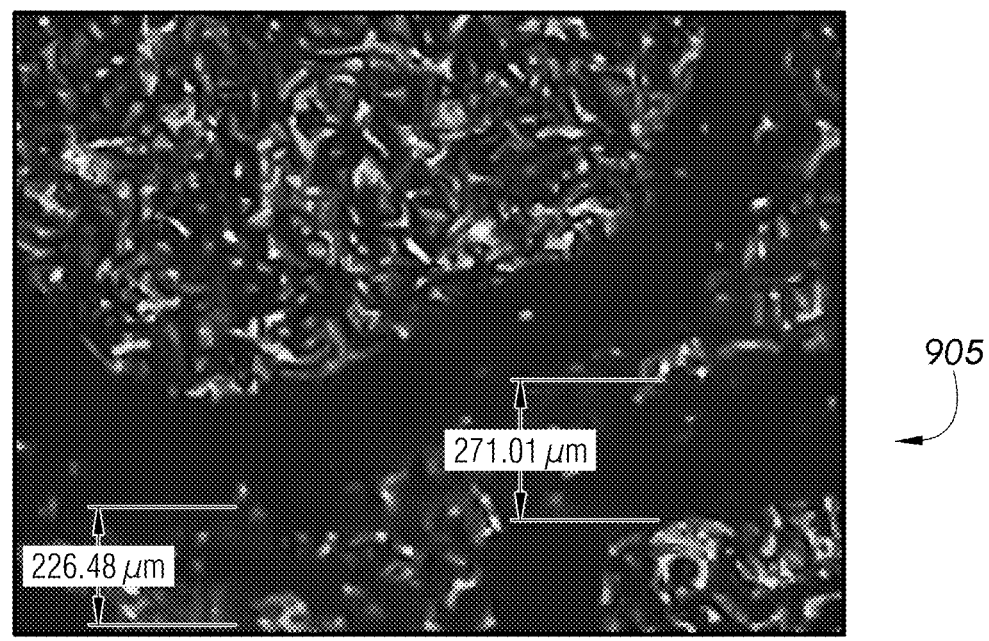
FIG. 11 depicts a photograph of a sample coated with a second commercially available UV-curable ink after being subjected to testing at high temperature and humidity.

Two commercially available UV-curable inks (Inks A and B) were deposited on pre-primed chemically-strengthened glass and tested under a high temperature, high humidity testing condition (85° C. and 95% relative humidity for 500 hours). FIGS. 10 and 11 depict the samples after the testing. As shown, both samples exhibited visible cracks 903, 905 as a result of shrinkage of the opaque layers. The photocurable inks beneficially do not exhibit visible such visible cracks when subjected to high temperature conditions over long periods, demonstrating the improved durability and reliability of the inks described herein.

Examples 6-10

Compositions for the Examples 6-10 are provided in Tables 8 and 9 (in wt %). Examples 6-8 utilized a first pigment dispersion ("Dispersion A") that was more viscous and had a more reactive monomer, while examples 9-10 utilized a second pigment dispersion ("Dispersion B") having a reactive monomer that was less reactive and viscous than the first pigment dispersion.

TABLE 8

| Component | Component Description | Example 6 | Example 7 | Example 8 |
|---|---|---|---|---|
| Dispersion A | Pigment dispersion | 35 | 35 | 35 |
| Phenylbis(2,4,6-trimethylbenzoyl)phosphine oxide or bisacylphosphine oxide | Type 1 photoinitiator | 4 | 4 | 4 |
| 2-Isopropylthioxanthone | Type II photoinitiator | 2 | 2 | 2 |
| Ethyl-4-dimethyl aminobenzoate | Amine synergist | 2 | 2 | 2 |
| Vinyl methyl oxazolidinone or 5-methyl-3-vinyloxazolidin-2-one | Reactive diluent | 17 | 42 | 26 |
| DPHA M600 (dipentaerythritol hexaacrylate) | Multifunctional monomer | 5 | 5 | 5 |
| 3-Methyl-1,5-pentanediyl diacrylate | Difunctional monomer | 35 | 10 | 26 |

TABLE 9

| Component | Component Description | Example 9 | Example 10 |
|---|---|---|---|
| Dispersion B | Pigment dispersion | 28 | 28 |
| Phenylbis(2,4,6-trimethylbenzoyl)phosphine oxide or bisacylphosphine oxide | Type 1 photoinitiator | 4 | 4 |
| 2-Isopropylthioxanthone | Type II photoinitiator | 2 | 2 |
| Ethyl-4-dimethyl aminobenzoate | Amine synergist | 2 | 2 |
| Vinyl methyl oxazolidinone or 5-methyl-3-vinyloxazolidin-2-one | Reactive diluent | 17 | 42 |
| DPHA M600 (dipentaerythritol hexaacrylate) | Multifunctional monomer | 12.5 | 10.0 |
| DPGDA M222 (dipropylene glycol diacrylate) | Difunctional monomer | 34.5 | 12.0 |

Figure 12:
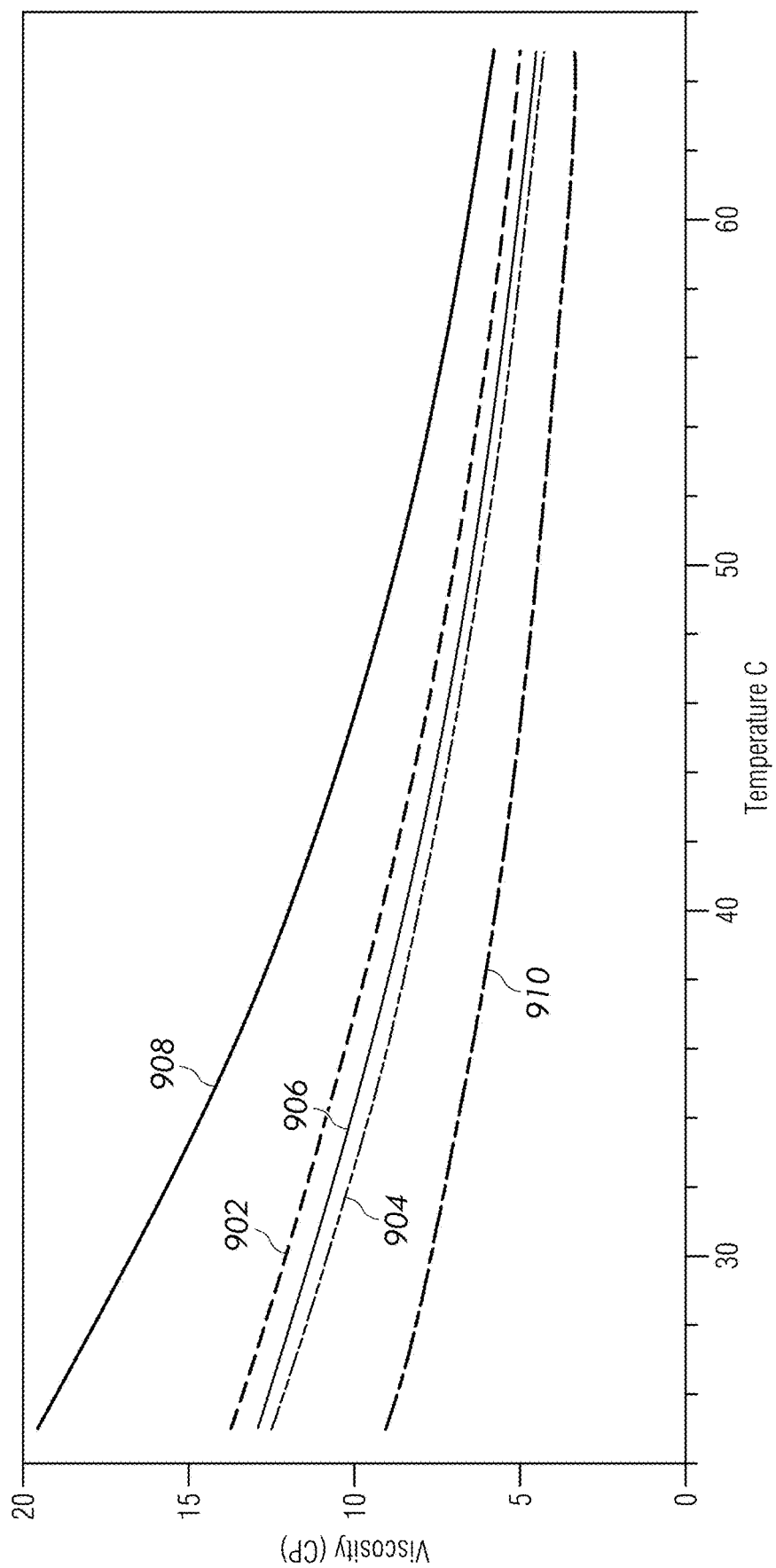
FIG. 12 depicts a plot of viscosity versus temperature example photocurable inks, according to one or more embodiments of the present disclosure.

As shown in Tables 8 and 9, for ink compositions with relatively reactive monomers (e.g., Examples 6-8 in the Examples section below), relatively high amounts of the reactive diluent may be used to lower the viscosity while also providing adequate mechanical properties. Moreover, a less reactive difunctional monomer (e.g., 3-methyl-1,5-pentanediyl diacrylate) may be used in such cases. For ink composition with pigment dispersions with relatively low viscosity and reactive monomers with relatively low reactivities (e.g., Examples 9 and 10 in the Examples section below), a more reactive third monomer (e.g., dipropylene glycol diacrylate) may be used. As exemplified, the amount of the difunctional monomer relative to the reactive diluent and the particular difunctional monomer used may be based on the viscosity and reactivity of the reactive monomer in the pigment dispersion The ink compositions according to the Examples 6-10 were measured for viscosity over a temperature range from 25° C. to 65° C. The results are shown in FIG. 12. FIG. 12 includes a first curve 902 representing Example 6, a second curve 904 representing Example 7, a third curve 906 representing Example 8, a fourth curve 908 representing Example 9, and a fifth curve 910 representing Example 10. As shown, each of the examples exhibited a viscosity in a range from 5 cPs to 18 cPs over the working temperature range from 30° C. to 50° C. associated with commercially available inkjet printheads. Examples 6, 7, 8, and 10 exhibited a viscosity in a range from 5 cPs to 13 cPs over the temperature range from 30° C. to 50° C. These results demonstrate that these inks are suitable for ink jetting from production printheads. Indeed, the composition according to Example 6 was successfully ink jetted with a KM1024iSHE printhead with a voltage of 10V, a pulse width of 5.4 μs, and a droplet temperature of 45° C., providing a droplet speed of about 5 m/s and a drop volume of 9.7 pL.

The composition according to Example 6 was deposited on a glass substrate and subjected to 4 deposition and pinning stages, where each UV light source was configured to apply a UV dosage of 0.24 J/cm$^2$ to each sub-layer. After deposition and pinning of all the sub-layers, it was found that a final curing stage with both the first and second UV light sources and providing a dose of 24 J/cm$^2$ was needed to provide a cross-hatch adhesion of >4B when tested per ASTM D3359.

The composition according to Example 7 was deposited on a glass substrate and subjected to 4 deposition and pinning stages without the final curing stage. Such a setup with each of the UV light sources being configured to apply a UV dosage of 5.2 J/cm² was found to be sufficient to achieve a complete cure and provide a cross-hatch adhesion of >4B when tested per ASTM D3359 (i.e., no final curing stage was needed).

Figure 13:
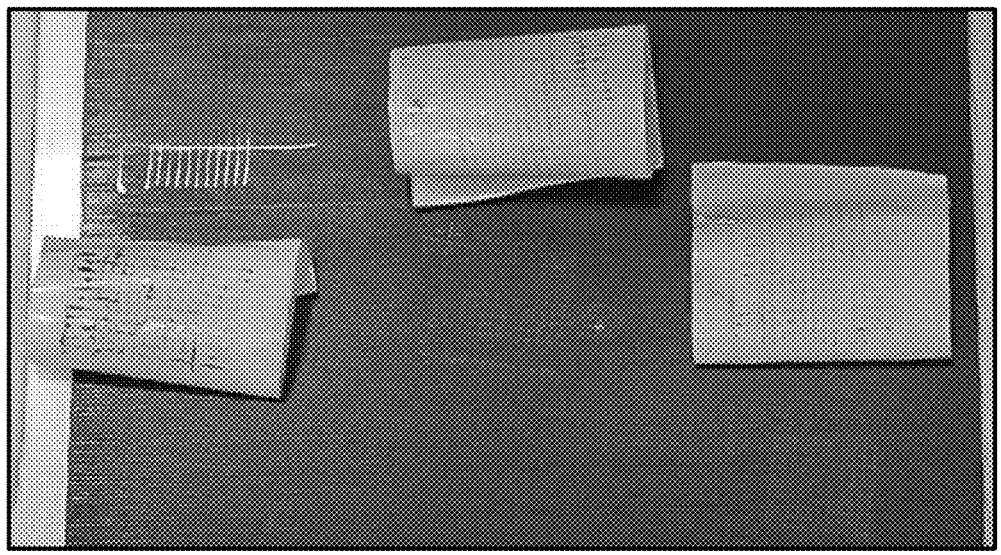
FIG. 13 is a photograph of samples with an example ink composition deposited thereon after being subjected to a cross-hatch adhesion test, according to one or more embodiments of the present disclosure.
Figure 14:
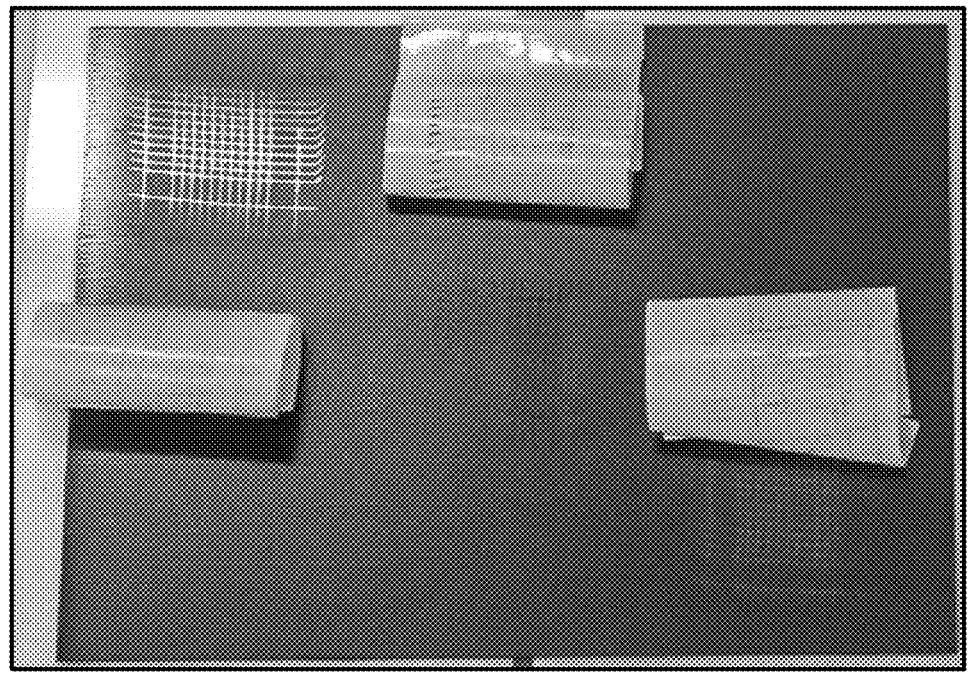
FIG. 14 is a photograph of samples with an example ink composition deposited thereon after being subjected to a cross-hatch adhesion test, according to one or more embodiments of the present disclosure.

Images of cross-hatch adhesion testing per ASTM D3359 for the cured Examples 6 and 7 are depicted in FIGS. 13 (Example 6) and 14 (Example 7) below. These results demonstrate that both the ink compositions provide a cross-hatch adhesion of >4B when tested per ASTM D3359, but the necessary curing conditions varied to achieve such adhesion performance.

Unlike the Example 6 composition, the Example 7 composition did not require a high dose final cure pass either from top or bottom and can be cured with significantly lower amount of UV dose, while still providing favorable adhesion. It is believed that this difference in curing performance between the Examples 6 and 7 stems from the difference in monomers. The composition according to Example 7 included a higher amount of the first monomer (reactive diluent) relative to the third monomer (difunctional monomer), while the composition according to the Example 6 included a relatively high amount of the third monomer. The inclusion of more reactive diluent at the relatively high percent in the Example 7 improves cure performance. When using pigment dispersions with high viscosity and relatively reactive monomer, it is believed that providing at least 25 wt % of the first monomer will improve cure performance. This improvement in the curing has broader implications as the relatively lower amounts of UV dosage needed provides flexibility in deposition and curing stage design. The lack of a need for the second light source illuminating the bottom of the glass provides more freedom and flexibility in the roller configuration and the size of glass used as there are no engineering constraints for accommodating a UV lamp in between the rollers to let the UV light to pass through.

Figure 15:
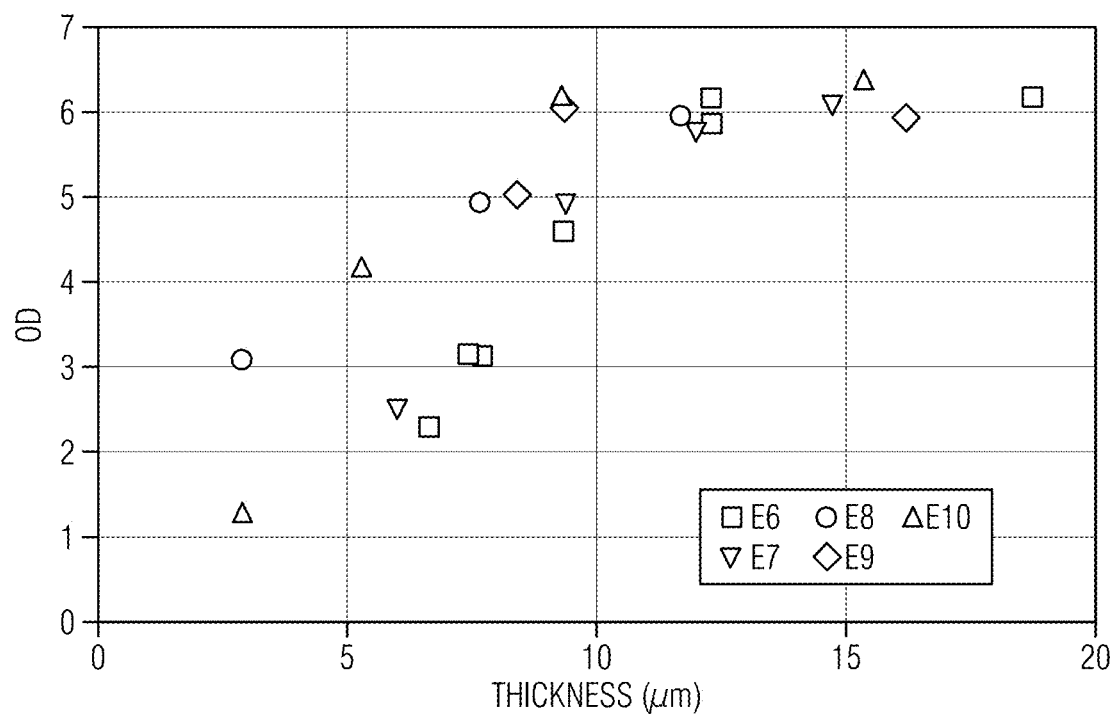
FIG. 15 is a plot of optical density (y-axis) versus thicknesses (x-axis; in μm) for opaque layers formed with example ink formulations, according to one or more embodiments of the present disclosure.

Ink compositions according to each of the Examples 6-10 were deposited onto glass substrates. A number of samples were prepared according to each ink composition and measured for thickness and optical density. The results are provided in FIG. 15. The curves flatten out at densities greater than 6 due to failure of measurement methods at such high densities. As shown, each of the ink compositions is capable of providing an optical density of greater than 5 at thickness that are less than 15 μm (e.g., between 10 μm and 12 μm), satisfying the stringent requirements for automotive applications described herein. Samples decorated with the ink composition according to Example 6 herein were also subjected to various tests described in the Table 4 herein. The results are provided in the Table 10 below.

TABLE 10

| Glass substrate - Test | ΔE (SCI) | ΔE (SCE) | Adhesion |
|---|---|---|---|
| Primed AutoGrade ™ for 3D - Thermal Shock | 0.14 | 0.19 | 5B |
| Primed AutoGrade ™ for 2D - Thermal Shock | 0.23 | 0.36 | 5B |
| Primed AutoGrade ™ for 3D - Damp heat (85/95) | 0.36 | 0.16 | 5B |
| Primed AutoGrade ™ for 2D - Damp heat (85/95) | 0.21 | 0.21 | 5B |
| Primed AutoGrade ™ for 3D - Solar exposure | 0.72 | 0.94 | 5B |
| Primed AutoGrade ™ for 2D - Solar exposure | 1.34 | 0.86 | 5B |

Ink Primers

Infrared Curable Ink Primer

Example

The formulation for Example 11 is shown in Table 11 (in wt %). The formulation according to Example 11 exhibited a viscosity of 7.8 cPs at 25° C., which is suitable for ink jetting production printheads. Indeed, the formulation according to Example 11 was successfully ink jetted with a KM1024iSHE printhead with a voltage of 10V, a pulse width of 5.4 μs, and a droplet temperature of 30° C., providing a droplet speed of about 5 m/s and a drop volume of 9.7 pL.

TABLE 11

| Component | Component Description | Example 6 |
|---|---|---|
| Methacryloxypropyl trimethoxysilane | Adhesion promoter | 2 to 10% |
| 3-methoxy-3-methyl-1-butanol | Solvent | 90% to 98% |

Figure 16:
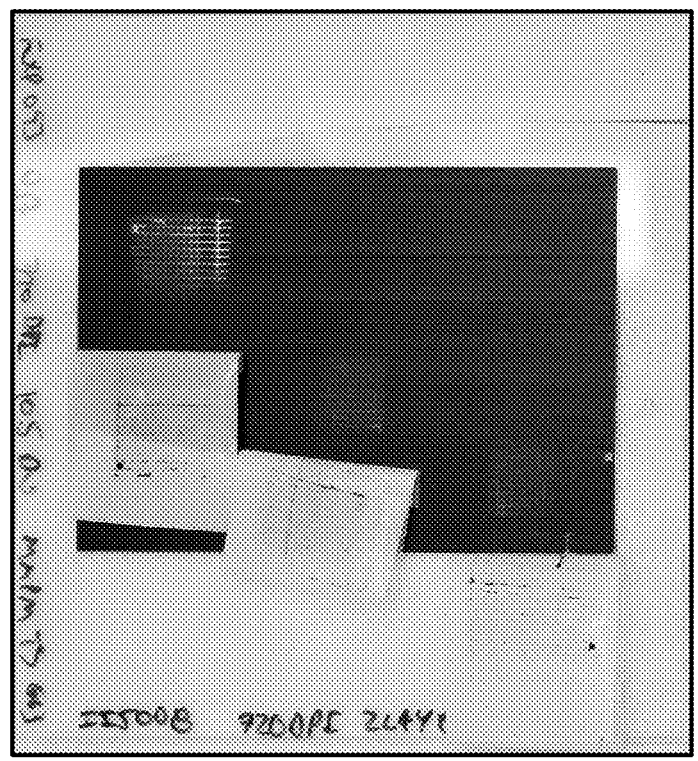
FIG. 16 is a photograph of samples with an example ink primer and an example ink formulation deposited thereon after being subjected to a cross-hatch adhesion test.

The formulation according to Example 11 was deposited on a glass substrate and subjected to heating at 110° C. for 1 hour in an oven to bond the adhesion promoter to the substrate. Various wet thicknesses of the formulation according to Example 11 (i.e., 3.2 ml/m² to 13.2 ml/m²) were printed and the adhesion was determined by cross-hatch adhesion testing after 500 1 hour cycles of being held at a temperature of −40° C. for 0.5 hours and a temperature of 95° C. for 0.5 hours, when tested according to ASTM 3359. A wet thickness of 8.4 ml/m² of the primer layer, images of the cross-hatch adhesion testing of which are shown in FIG. 16, provided the best adhesion of a UV curable ink composition to the glass substrate.

Samples the formulation according to Example 11 were also subjected various tests described in Table 4. The results are provided in Table 12.

TABLE 12

| Glass substrate - Test | ΔE (SCI) | ΔE (SCE) | Adhesion |
|---|---|---|---|
| Primed AutoGrade ™ for 3D - Thermal Shock | 0.14 | 0.19 | 5B |
| Primed AutoGrade ™ for 2D - Thermal Shock | 0.23 | 0.36 | 5B |
| Primed AutoGrade ™ for 3D - Damp heat (85/95) | 0.36 | 0.16 | 5B |
| Primed AutoGrade ™ for 2D - Damp heat (85/95) | 0.21 | 0.21 | 5B |
| Primed AutoGrade ™ for 3D - Solar exposure | 0.72 | 0.94 | 5B |
| Primed AutoGrade ™ for 2D - Solar exposure | 1.34 | 0.86 | 5B |

Ultraviolet Curable Ink Primer

Examples 12 and 13

The formulation for Examples 12 and 13 are shown in Table 13 (in wt %). The ink formulations according to Examples 12 and 13 exhibited viscosities between 7 cPs and 12 CPs from 35° C. to 45° C., which is suitable for ink jetting production printheads. Indeed, the formulations according to Examples 12 and 13 were successfully ink jetted with a KM1024iSHE printhead with a voltage of 10V, a pulse width of 5.4 μs, and a droplet temperature of 45° C., providing a droplet speed of about 5 m/s and a drop volume of 9.7 pL.

TABLE 13

| Component | Component Description | Example 12 | Example 13 |
|---|---|---|---|
| Phenylbis(2,4,6-trimethylbenzoyl)phosphine oxide or bisacylphosphine oxide | Type 1 photoinitiator | 4 | 4 |
| 2-Isopropylthioxanthone | Type II photoinitiator | 2 | 2 |
| Ethyl-4-dimethyl aminobenzoate or N,N-[2-(4-dimethylaminobenzoyl)oxyethylen-1-yl] methylamine | Amine synergist | 2 | 2 |
| Vinyl methyl oxazolidinone or 5-methyl-3-vinyloxazolidin-2-one | Reactive diluent | 20 | 20 |
| Isobornyl acrylate | Monofunctional monomer | 42 | 38 |
| 3-methyl-1,5-pentanediyl diacrylate | Difunctional monomer | 20 | 16 |
| Methacryloxypropyl trimethoxysilane | Adhesion promoter | 10 | 10 |
| 3-methoxy-3-methyl-1-butanol | solvent | — | 8 |

Figure 17:
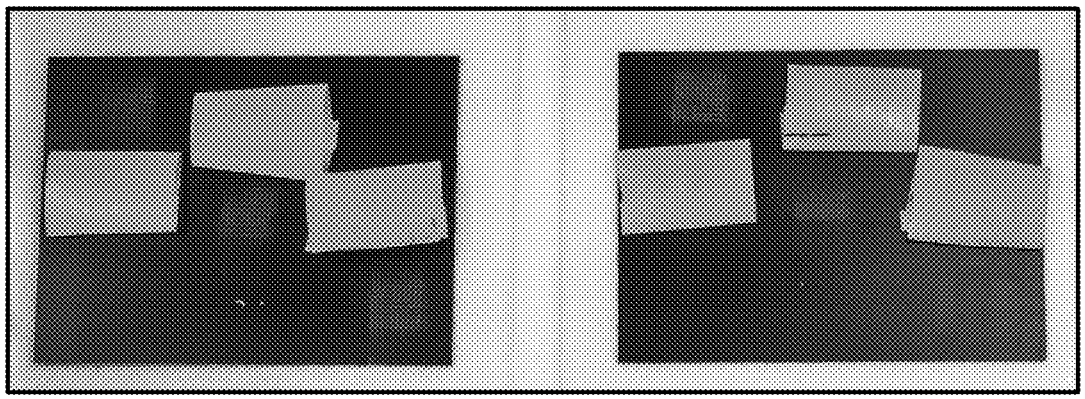
FIG. 17 is a photograph of samples with an example ink primer and an example ink formulation deposited thereon after being subjected to a cross-hatch adhesion test.
Figure 18:
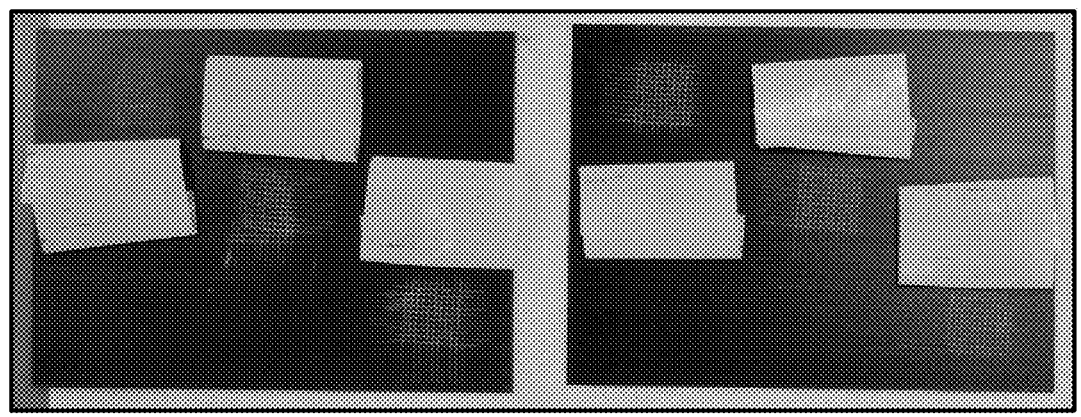
FIG. 18 is a photograph of samples with an example ink primer and an example ink formulation deposited thereon after being subjected to a cross-hatch adhesion test.

The formulation according to Example 13 was deposited on a glass substrate and exposed to a 395 nm wavelength UV LED lamp at a dosage of about 15 J/cm$^2$ to cure the primer formulation. A UV curable ink composition was then deposited on the primer layer and was exposed to the 395 nm wavelength UV LED lamp at a dosage of about 15 J/cm$^2$ to cure the ink composition and crosslink the vinyl group of the polymer with the ink monomer. This was followed by heating the primer layer and ink layer at 85° C. for 20 minutes to covalently bind the Si—O group of the primer to the glass. As shown in FIGS. 17 and 18, adhesion was determined by cross-hatch adhesion testing after 500 1 hour cycles of being held at a temperature of −40° C. for 0.5 hours and a temperature of 95° C. for 0.5 hours, when tested according to ASTM 3359. Each of the samples had an adhesion greater than 4B. A total thickness of primer and ink of 13.6 μm and 12.48 μm and optical density of 6.18 and 5.83, respectively, were achieved, satisfying the stringent requirements for automotive applications described herein.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The invention claimed is:

1. A glass article comprising:
a glass substrate having a first major surface and a second major surface, the second major surface being opposite the first major surface; and
an opaque layer disposed on the second major surface, the opaque layer comprising a cured ink comprising at least 11 wt % of a pigment, wherein:
the pigment comprises a carbon black pigment with an average particle size less than or equal to 200 nm,
the opaque layer comprises cross-linked vinyl and acrylate groups,
the opaque layer is formed from an ink composition that, prior to being cured, is resin free and (2,4,6-trimethylbenzoyl)diphenyl phosphine oxide free,
the opaque layer comprises a thickness less than or equal to 15 μm and an optical density greater than or equal to 5.0, and
when viewed from the first major surface and illuminated at a 10° angle by a D65 illuminant, an area of the glass article covered by the opaque layer exhibits:
a CIELAB SCI L* value less than or equal to 30,
a CIELAB SCI a* value greater than or equal to −0.05 and less than or equal to 0.15, and
a CIELAB SCI b* value greater than or equal to −0.3 and less than or equal to −0.1, and
the opaque layer exhibits:
a pencil hardness greater than or equal to 3H, when measured according to ASTM 3363, and
an adhesion to the glass substrate greater than or equal to 4B, after being subjected to a temperature of 85° C. at 95% relative humidity for a period of at least 500 hours, when tested according to ASTM 3359.

2. The glass article of claim 1, wherein the CIELAB SCI L* value is less than or equal to 28.

3. The glass article of claim 1, wherein the CIELAB SCI L* value is less than or equal to 25.

4. The glass article of claim 1, when viewed from the first major surface and illuminated at a 10° angle by a D65 illuminant, an area of the glass article covered by the opaque layer exhibits a CIELAB SCE L* value that is less than or equal to 1.

5. The glass article of claim 1, when viewed from the first major surface and illuminated at a 10° angle by a D65 illuminant, an area of the glass article covered by the opaque layer exhibits a CIELAB SCE a* value that is greater than or equal to −0.1 and less than or equal to 0.1.

6. The glass article of claim 1, when viewed from the first major surface and illuminated at a 10° angle by a D65 illuminant, an area of the glass article covered by the opaque layer exhibits a CIELAB SCE b* value that is greater than or equal to −0.1 and less than or equal to 0.1.

7. The glass article of claim 1, wherein the opaque layer comprises sub-layers that are in direct contact with one another.

8. The glass article of claim 7, wherein the sub-layers are formed of different materials.

9. The glass article of claim 1, wherein the opaque layer comprises an adhesion promoter that is bonded to the glass substrate and polymerized with an ink layer of the adhesion promoter.

10. The glass article of claim 9, wherein the adhesion promoter comprises an organofunctional silane.

11. The glass article of claim 9, wherein the opaque layer exhibits an adhesion to the glass substrate greater than or equal to 4B, after 500 1 hour cycles of being held at a temperature of −40° C. for 0.5 hours and a temperature of 95° C. for 0.5 hours, when tested according to ASTM 3359.

12. The glass article of claim 11, wherein the glass article exhibits a maximum ΔE value (both SCI and SCE), measured both prior to and after the 500 1 hour cycles, that is less than 2.0.

13. The glass article of claim 1, wherein the average particle size is less than or equal to 150 nm.

14. The glass article of claim 1, wherein the average particle size less than or equal to 100 nm.

15. The glass article of claim 1, wherein the glass substrate comprises at least one of soda lime glass, aluminosilicate glass, borosilicate glass, boroaluminosilicate glass, alkali-containing aluminosilicate glass, and alkali-containing borosilicate glass.

16. The glass article of claim 1, wherein the opaque layer exhibits a cured surface tension greater than 36 dynes/cm.

17. The glass article of claim 1, wherein the opaque layer exhibits an electrical resistivity greater than or equal to $1\times10^9$ Ω/sq, when measured according to ASTM D-257 at 100V DC.

18. The glass article of claim 1, wherein the cured ink comprises less than 20 wt % of the pigment.

19. The glass article of claim 18, wherein the cured ink comprises greater than or equal to 13 wt % of the pigment.

20. The glass article of claim 1, wherein the thickness is greater than or equal to 10 μm and less than or equal to 12 μm.

\* \* \* \* \*